(12) United States Patent
Esslinger

(10) Patent No.: US 8,319,139 B2
(45) Date of Patent: Nov. 27, 2012

(54) BORE WELDING DEVICE WITH WORM DRIVE AND ADJUSTABLE CLAMPING SPINDLE

(76) Inventor: Thomas Esslinger, Langdon, NH (US)

( * ) Notice: Subject to any disclaimer, the term of this patent is extended or adjusted under 35 U.S.C. 154(b) by 285 days.

(21) Appl. No.: 12/847,287

(22) Filed: Jul. 30, 2010

(65) Prior Publication Data

US 2011/0024394 A1   Feb. 3, 2011

Related U.S. Application Data

(60) Provisional application No. 61/230,286, filed on Jul. 31, 2009, provisional application No. 61/247,760, filed on Oct. 1, 2009.

(51) Int. Cl.
*B23K 9/04* (2006.01)

(52) U.S. Cl. .................. 219/76.1; 219/125.11

(58) Field of Classification Search ............... 219/76.1, 219/125.11
See application file for complete search history.

(56) References Cited

U.S. PATENT DOCUMENTS

| | | | | |
|---|---|---|---|---|
| 4,952,769 A | * | 8/1990 | Acheson | 219/76.14 |
| 5,298,710 A | * | 3/1994 | Acheson et al. | 219/76.14 |
| 5,536,913 A | * | 7/1996 | Weidner et al. | 219/73 |
| 5,539,177 A | * | 7/1996 | Okuya et al. | 219/61 |
| 6,000,600 A | * | 12/1999 | Erikson et al. | 228/212 |
| 6,171,398 B1 | * | 1/2001 | Hannu | 118/306 |
| 6,284,995 B1 | * | 9/2001 | Esslinger et al. | 219/76.14 |
| 6,448,531 B1 | * | 9/2002 | Esslinger et al. | 219/76.14 |
| 6,486,438 B1 | * | 11/2002 | Esslinger | 219/125.11 |
| 6,621,035 B2 | * | 9/2003 | Esslinger | 219/76.14 |
| 6,737,608 B2 | * | 5/2004 | Esslinger et al. | 219/125.11 |
| 6,779,709 B2 | * | 8/2004 | Stotler et al. | 228/113 |

* cited by examiner

*Primary Examiner* — Douglas Menz
(74) *Attorney, Agent, or Firm* — Davis & Bujold, PLLC

(57) ABSTRACT

A bore welding mechanism comprising a casing having spindle bushings rotationally and axially supporting a rotatable and axially translatable spindle for supporting a bore repair mechanism in alignment with a bore. The spindle has an axially extending keyway and a worm gear thread extending for at least a part of a length of the spindle. A spindle drive gear is coupled to the spindle by a drive key engaging with the keyway of the spindle so that the spindle is rotationally fixed to the spindle drive gear and axially translatable with respect to the spindle drive gear. A drive shaft extends through the casing, transversely to and offset from an axis of the spindle, and includes a drive shaft worm gear rotationally fixed to the drive shaft. The worm gear engages with the spindle drive gear to rotate the spindle drive gear and the spindle due to rotation of the drive shaft.

12 Claims, 15 Drawing Sheets

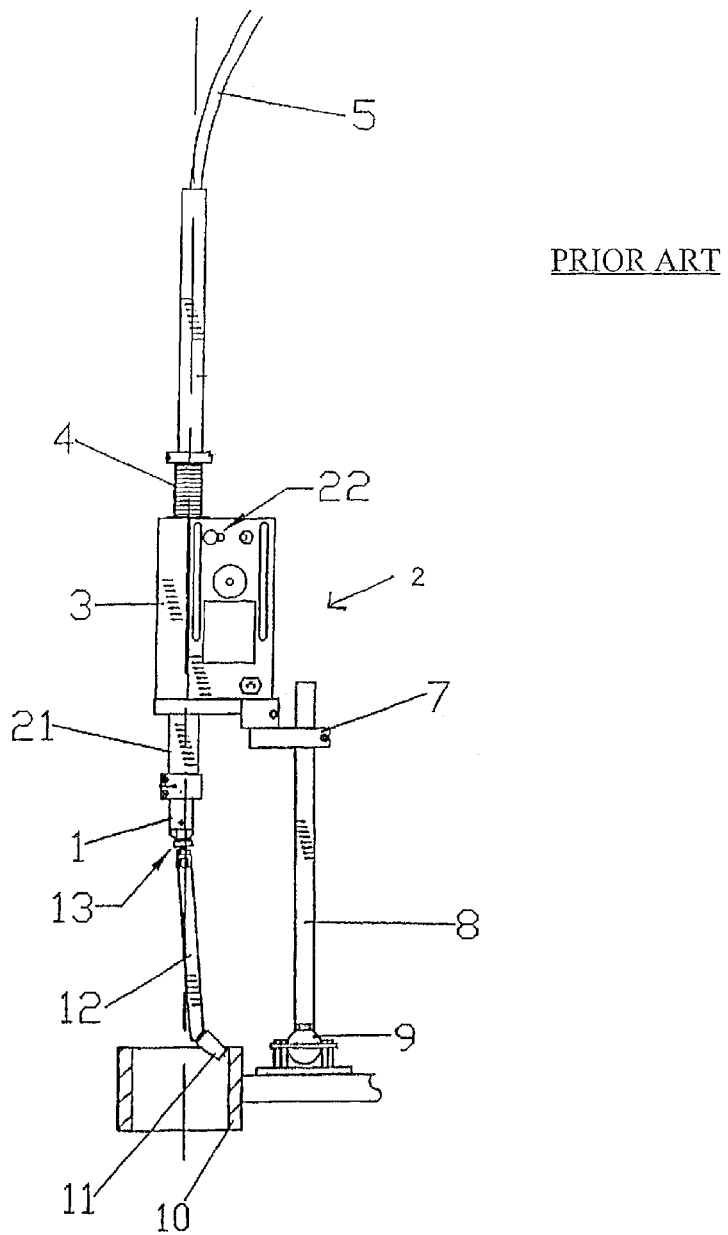

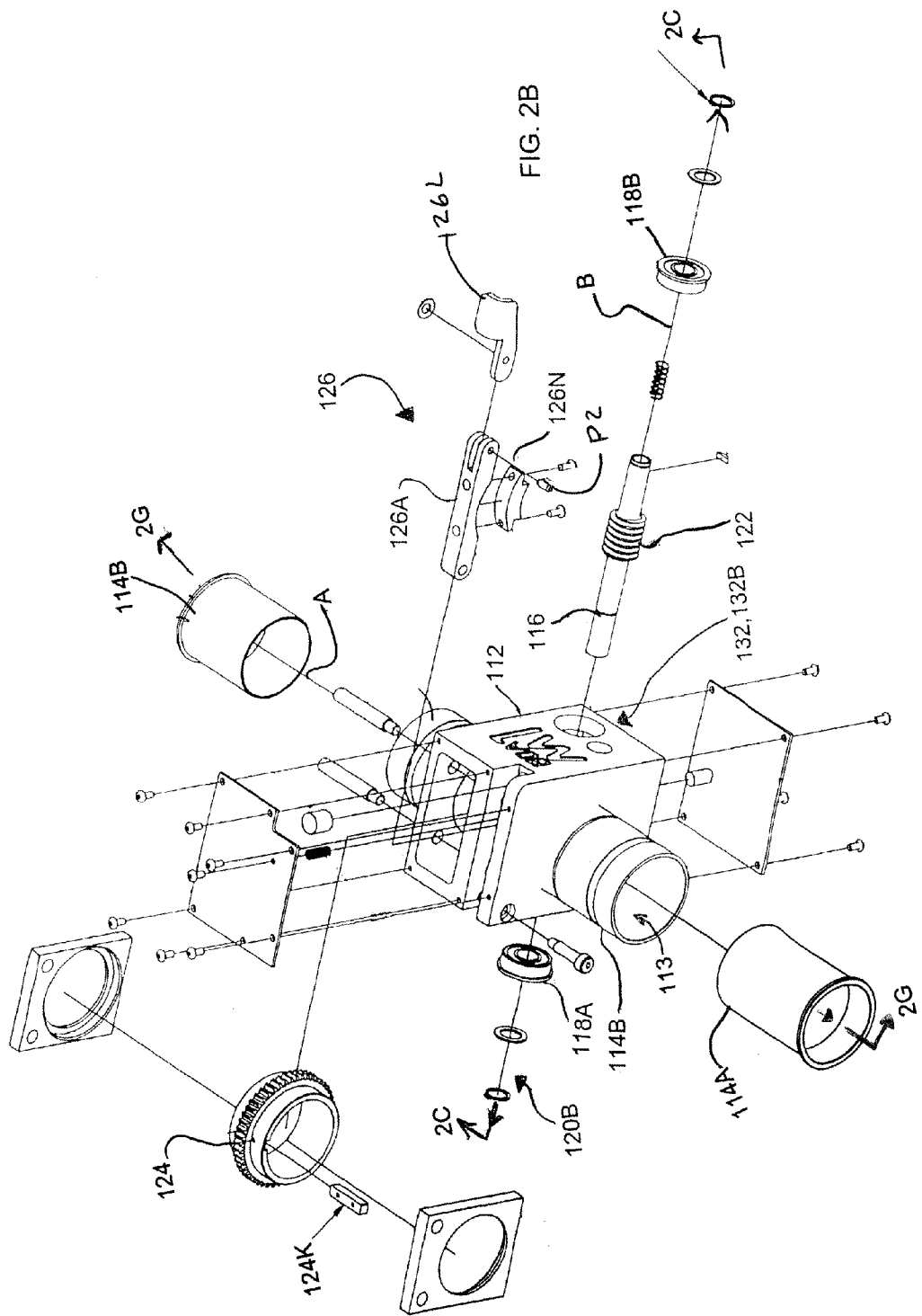

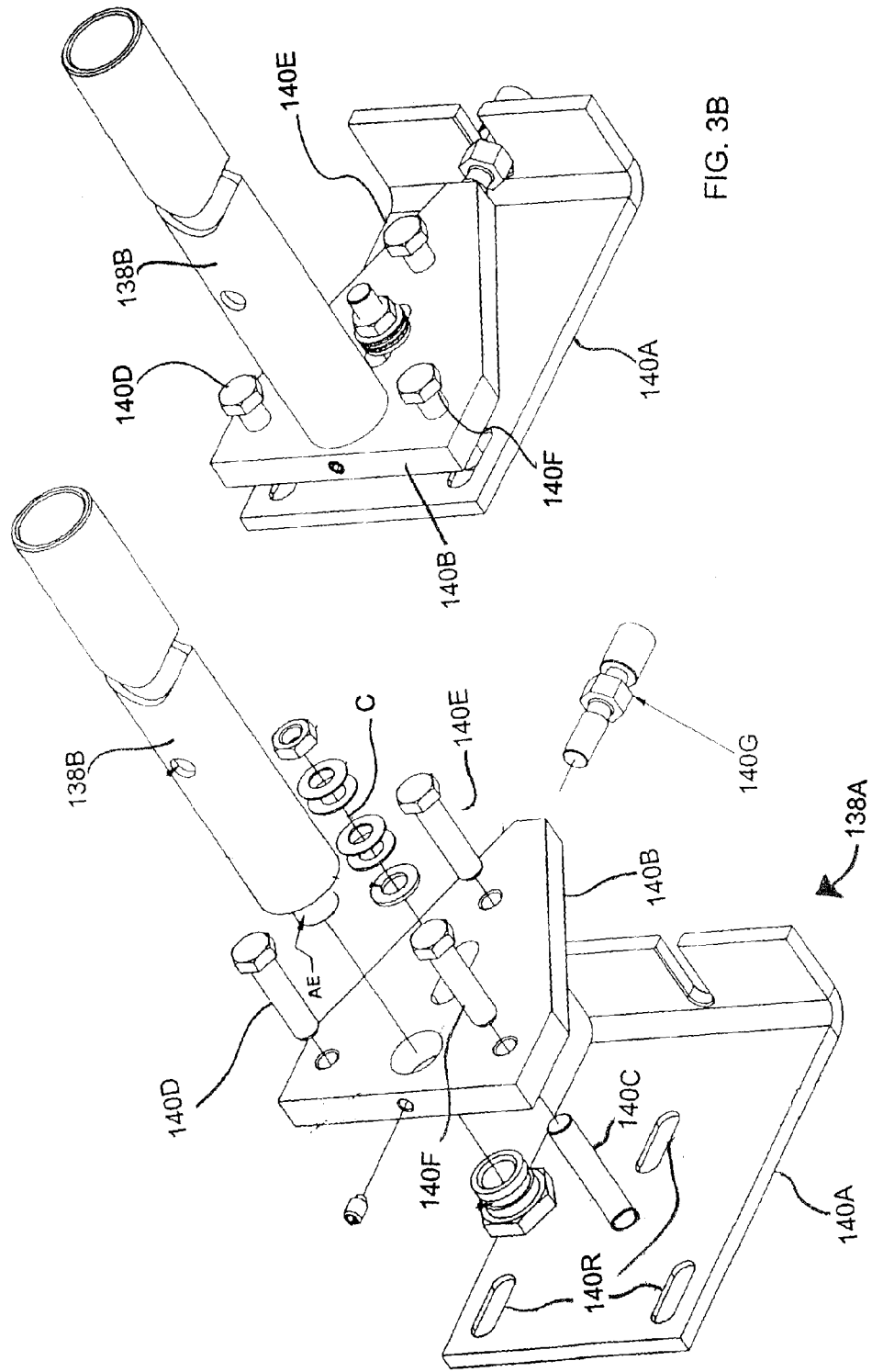

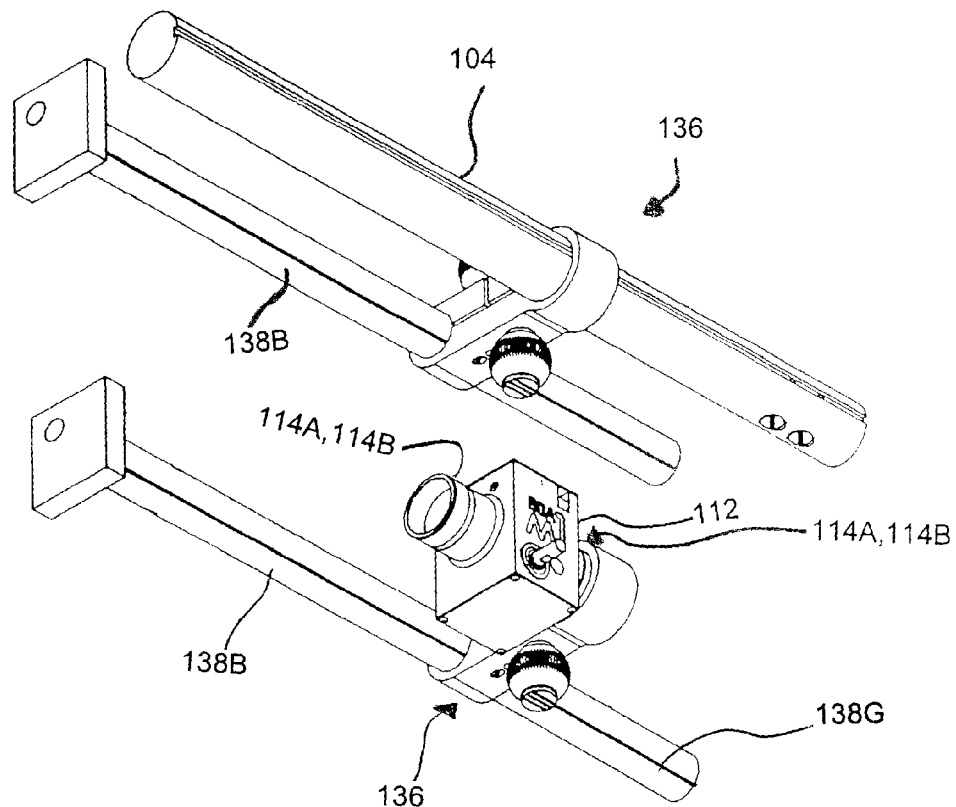
FIG. 3F
FIG. 3E
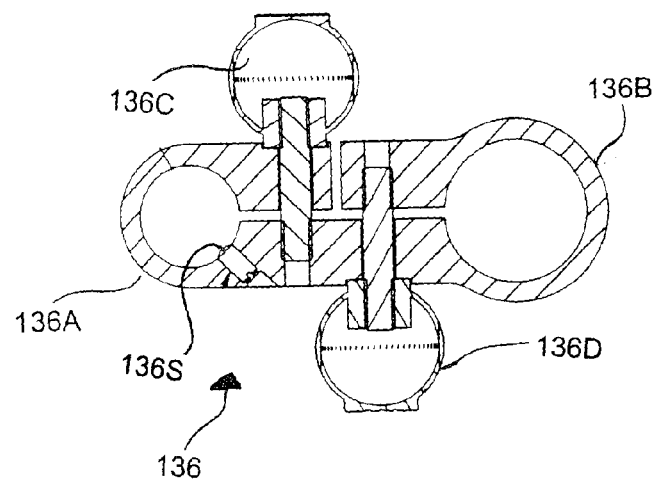
FIG. 3G

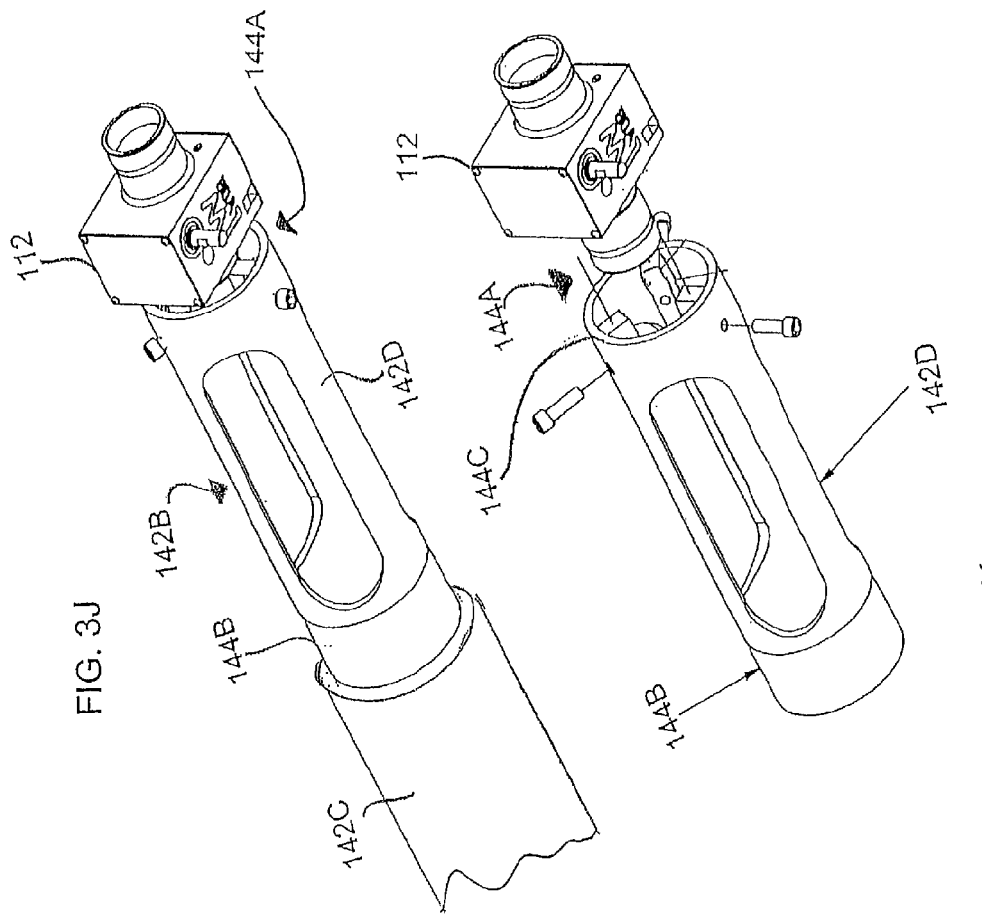
FIG. 3J
FIG. 3K
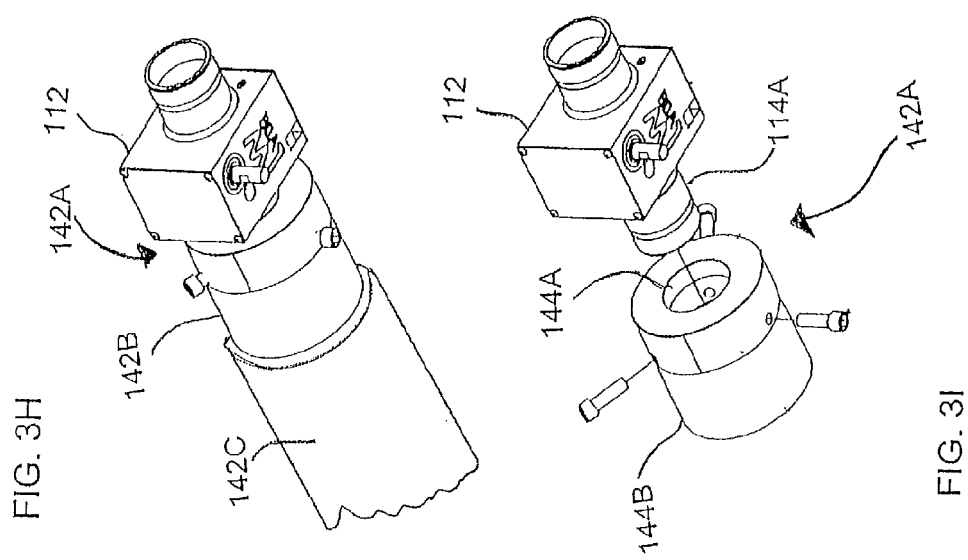
FIG. 3H
FIG. 3I

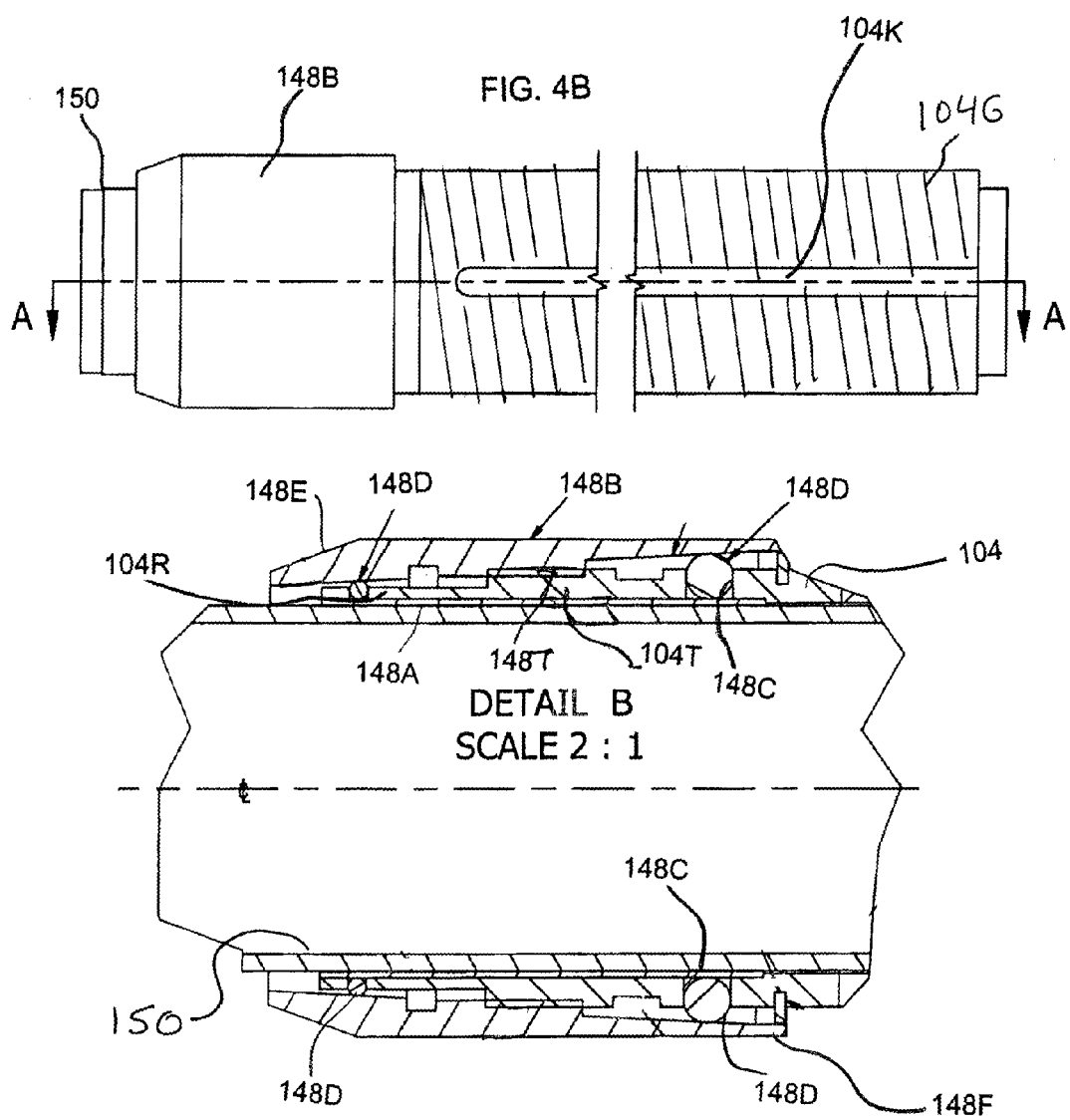

BORE WELDING DEVICE WITH WORM DRIVE AND ADJUSTABLE CLAMPING SPINDLE

CROSS REFERENCE TO RELATED APPLICATIONS

The present patent application is related to and claims benefit of U.S. Provisional Patent Appln. No. 61/230,286 filed Jul. 31, 2009 by Thomas Esslinger for a BORE WELDING DEVICE WITH WORM DRIVE and U.S. Provisional Patent Apply. No. 61/247,760 filed Oct. 1, 2009 by Thomas ESSLINGER for an ADJUSTABLE CLAMPING SPINDLE.

FIELD OF THE INVENTION

The present invention relates to a device for repairing bores, that is, circular openings in heavy machinery or equipment that support an axle or a shaft, and, in particular, welding devices for reconstructing bores in heavy equipment or machinery.

BACKGROUND OF THE INVENTION

Heavy equipment and machinery frequently require repair and it is generally preferable that such repair be done in the field rather than transporting the machinery or the equipment to a suitable repair facility as field repair reduces the associated time and cost required for repair. One of the most commonly required repairs for large machinery or equipment is the repair of a bore, that is, a circular opening that supports an axle or a shaft, for example. These circular openings become damaged or excessively worn due to a variety of reasons and causes, including mechanical wear of the parts, resulting in a need to restructure or reconstruct the bore to it original shape and diameter or possibly add a layer to a surface of the bore (e.g., "cladding"). It may also be desirable to modify a bore for any of a number of reasons, such as reconstructing the bore with a greater or a small diameter to accommodate a different sized shaft or axle, etc.

The repair of a damaged or worn bore or the modification of a bore for any reason typically involves rebuilding the interior surface of the bore by the deposition of a metal, typically by a welding or a flame deposition process, and then the subsequent boring and/or machining of the rebuilt or refabricated bore to the precisely required internal diameter. The material addition process is typically performed in the field by a rotatable portable welding or flame deposition device while the machining process is typically performed in the field by a portable boring machine which has a boring bar that is inserted into the bore. The boring bar is typically supported by a pair of spaced apart bearings located on each side of the bore being repaired and typically supports one or more replaceable tools for machining the bore, such as a variety of conventual cutting or machining tools for machining and/or finishing the surface of the bore being repaired.

As is conventional in the art, the boring bar is supported at each opposed end thereof by bearings which provide the radial support and rigidity for the tools that are necessary for accurate machining and/or finishing of a bore. It is to be appreciated that accurate reconstruction of a bore requires the accurate guidance of welding device as well as the boring bar supporting the machining and/or finishing tool(s) through the bore to achieve the desired bore diameter and alignment as well as the desired machined finish on the interior surface of the bore.

The application of a continuous layer (or layers) of a weld bead on the inside surface of a bore that forms a welded "shell" of a generally smaller inside diameter than the previous bore size, without rotating the part that contains the bore, is commonly referred to as "bore welding". The bore welding process has been refined in various respects over the years, but has generally maintained the same basic size, design and configuration. Issues that continue to be of concern with the existing bore welding machines typically center around the size and the weight of the bore welding equipment. It is not an infrequent occurrence that some bore welding situations cannot easily be handled with existing bore welding equipment because of the size of the currently available equipment does not easily permit use within the available space so that such bore to be repaired can be readily rebuilt. Bore alignment issues can also arise because the weight of the equipment may possibly cause deflection of a support component (or components) that is essential for proper alignment of the bore welding equipment with the bore to be repaired. Other issues involve reliability of electrical and mechanical components of the bore welding equipment, which are often complex and somewhat cumbersome to use, particularly in confined spaces.

The present invention is directed at improvements concerning bore welding equipment and, in order to more clearly illustrate the nature of such improvements and in order to provide a context for such improvements, the following will first describe exemplary bore welding equipment in which such improvements may be implemented. As the present invention generally relates to modifications concerning U.S. Pat. Nos. 6,137,076, 6,284,995, 6,448,531 and 6,737,738, a brief discussion concerning such prior art portable welding device will first be provided and the disclosure of such patents are incorporated herein by reference.

A. Introduction

Exemplary Prior Art Bore Welding Mechanism

First referring to FIG. 1, a diagrammatic isometric representation of an exemplary bore welding mechanism 2, according to the prior art, is shown in which the present invention may be implemented. As illustrated, the bore welding mechanism 1 includes an apparatus for providing a uniform welding bead on the interior surface of a desired circular bore 10. The bore welding mechanism 2 comprises a first hollow arm 1 having first end affixed to a first end of a swivel bearing 13 while a second end of the swivel bearing 13 is affixed a first end of a second hollow arm 12. A nozzle 11 is affixed to a leading second end of the second hollow arm 12. This simple arrangement allows an operator to readily adjust the relative position of the bore welding mechanism 2 with respect to bores 10 having various radii. Adjustment of the effective radii of the bore welding mechanism 2 is achieved by swinging or moving the second hollow arm 12, about the swivel bearing 13, so as to position the nozzle 11 of the welding torch in close proximity to the surface of the bore 10 to be rebuilt.

The bore welding mechanism 2 can be conveniently aligned with a desired bore 10 by fixing the clamping mechanism 9 to a support surface and then adjusting the adjustable support bracket mechanism 7 axially along a mounting support or rod 8. Once the bore welding mechanism 2 is so adjusted, the relative axial position of the welding arm can be adjusted by a clutch mechanism 22 (the internal components of which are not shown in detail) which releases the welding device so that the welding device, including the first and second arms 1, 12 and the nozzle 11, may be freely adjusted axially, relative to both the bore 10 to be rebuilt as well as the bore welding mechanism 2, to a desired initial axial starting position.

The clutch mechanism 22 engages a threaded guide 4 that controls the axial movement or indexing of the bore welding mechanism 2 as the bore welding mechanism 10 rotates about its rotational axis. As is well known, the rate of axial movement or indexing of the welding arms 1, 12 depends upon the size or pitch of the threads provided on the exterior surface of a threaded spindle 21 which engages with the clutch mechanism 22. A typically screw pitch ranges from about six to about ten threads or rotations per inch, but virtually any desired thread pitch is conceivable.

A housing 3 surrounds and accommodates the spindle 21 which extends axially through the bore welding mechanism 2 and supports a removable a welding material carrier mechanism, e.g., a welding torch head as well as the flexible supply lines from a stationary base. As is well known, when the clutch mechanism 22 is disengaged from the spindle 21, the welding device may be freely adjusted axially, relative to both the bore 10 to be rebuilt as well as the bore welding mechanism 2, to a desired initial starting position, but when the clutch mechanism 22 is engaged with the spindle 21, the welding device is fixedly axially supported relative to both the bore 10 to be rebuilt as well as the bore welding mechanism 2, to prevent relative motion unless the spindle 21 is rotated.

As is conventional in the art, the drive for the bore welding mechanism 2, may be rotated in either rotational direction and a rotational speed/directional controller is provided for controlling the rotational direction and the speed of the spindle. The welding material supply mechanism 5 comprises a welding wire guide liner, a welding current path, and a welding gas conduit. A welding wire guide passes through the first arm 1, the swivel bearing 13 and the second arm and through a gas diffuser to a welding tip and finally through the welding nozzle 11. The welding current runs through the wall of the first hollow arm 1, the swivel bearing 13 and the second hollow arm 12 to the nozzle 11. Welding gas is supplied through the first and second hollow tubes to the gas diffuser.

Based upon the above discussed prior art, it will be appreciated that the present invention provides a solution to overall size of such devices as well as permitting a variety of external drives to be utilized to power or drive the bore welding mechanism.

SUMMARY OF THE INVENTION

The present invention is directed to a bore welding mechanism including a casing having spindle bushings rotationally and axially supporting a rotatable and axially translatable spindle for supporting a bore tool in alignment with a bore. The spindle has an axially extending keyway and a thread extending for at least a part of a length of the spindle and including a worm gear coupled to the spindle by a drive key engaging with the keyway of the spindle so that the spindle is rotationally fixed to the worm gear and axially translatable with respect to the worm gear. A drive shaft extends through the casing transversely to and offset from an axis of the spindle and including a drive shaft worm rotationally and axially fixed to the drive shaft and engaged with the worm gear to rotate the worm gear and spindle by rotation of the drive shaft.

The present invention further includes a spindle drive clutch mechanism which includes a drive nut arm mounted to the casing by a pivot and transversely to and offset from the axis of the spindle and a drive nut mounted to the drive nut arm and having a circumferentially curved inner surface conforming to an outer diameter of the spindle, the inner surface of the drive nut being threaded to engage the spindle thread. According to the present invention, the drive nut is axially fixed with respect to the axis of the spindle with the threaded inner surface of the drive nut being brought into engagement or out of engagement with the spindle thread by rotation of the drive nut arm about the casing pivot, so that the spindle is axially traversed along the spindle axle by rotation of the drive shaft when the drive nut arm is rotated to engage the drive nut thread with the spindle thread.

In other aspects, of the present invention the casing further includes first and second spindle bushings radially supporting the spindle and wherein the first and second spindle bushings extend axially within the passageway defined by the casing along the axis of the spindle for attachment to a bore welding mechanism support structure by at least one of the first and second spindle bushings.

In a yet further aspect of the present invention, an external drive coupler is mountable in and extends outward from a hollow outer end section of the drive shaft for connecting an external drive mechanism to the drive shaft of the bore welding mechanism. The external drive coupler includes a external drive connector mounted on an outer end of the external drive coupler for connection to an external drive mechanism and a generally cylindrical locking section connected with the external drive connector and located on an end of the external drive coupler toward the drive shaft. According to the present invention, the locking section has a first diameter closely fitting into the hollow outer end section of the drive shaft and includes a first section located at a first end of the locking section adjacent the external drive connector and having a second diameter smaller than the first diameter of the locking section, a short key cut away section extending from the first narrowed diameter section of the locking section toward a second end of the locking section adjacent the drive shaft wherein short key cutaway section is a cut away segment of the cylindrical locking section with a flat side forming a chord of that portion of the locking section, and a long key cut away section extending between the first narrowed diameter section of the locking section and to the second end of the locking section wherein the long key cut away section is a cutaway segment of the cylindrical locking section with a flat side forming a chord of that portion of the locking section.

In addition, a bias spring is located in the hollow drive shaft between the external drive coupler and an inner end of the hollow end of the drive shaft to resiliently bias the external drive coupler toward the outer end of the drive shaft, and there is located in the hollow outer end section of the drive shaft a motor key slot extending through the wall of the drive shaft transversely to the drive shaft to receive a motor key forming segment of a disk having a flat side forming a chord of the disk.

According to the present invention, an external drive mechanism may be connected to the external drive connector and the external drive coupler connected to the drive shaft by sliding the locking section into the hollow end of the drive shaft with the flat side of the long key cut away section oriented toward the flat side of the motor key with flat side of the long key cut away section passing along the flat side of the motor key until the narrower diameter first section of the locking section is aligned with the motor key, rotating the locking section in the hollow end of the drive shaft until the flat side of the short key cut away section is aligned with the flat side of the motor key, and allowing the bias spring to move the locking section outwards with respect to the drive shaft will the flat side of the short key cut away section passing along the flat side of the motor key until an inner end of the flat side of the short key cut away section abuts the motor key. The external drive mechanism may be disconnected from the external drive connector and the external drive coupler by reversal of the connecting steps.

The present invention includes mounts for a bore welding mechanism, including an adjustable mount for a bore welding mechanism that includes a fixed base secured to a surface having a fixed axial and lateral relationship with a bore, an adjustable base moveably mounted the fixed base and a mounting shaft mounted to the adjustable base to be secured to one of a spindle and a spindle bushing extending from a casing of the bore welding mechanism. The adjustable base includes a pivot support extending between a center of angular rotation of the adjustable base about a pivot center of the fixed base and supporting the center of angular rotation of the adjustable base at a fixed radius with respect to the pivot center of the fixed base, a plurality of angle adjustment screw assemblies symmetrically located about the center of angular rotation of the adjustable base and contacting the fixed base at locations symmetrically located about the pivot center of the fixed base for adjusting an angle of rotation of the adjustable base with respect to the fixed base, and a mounting shaft spacing adjustment screw assembly mounted between the fixed base and the adjustable base along an axis generally parallel to the fixed base and generally orthogonal to an axis of the mounting shaft for adjusting a lateral position of the axis of the mounting shaft with respect to a bore. The fixed base includes a plurality of lateral adjustment grooves for receiving the mating ends of the angle adjustment screw assemblies to support movement of the mating ends of the angle adjustment screw assemblies with lateral movement of the adjustable base with respect to the fixed base.

The present invention also includes an offset support structure for a bore welding mechanism, which includes an offset mount body comprised of a resiliently deformable material wherein the ends of the offset mount body are shaped to form two clamps, and a clamp bolt for and corresponding to each clamp for adjusting the corresponding clamp. According to the present invention, one of the clamps is secured to one of a spindle and a spindle bushing extending from a casing of the bore welding mechanism and another of the claims is secured to a supporting shaft, and the clamps are adjustable by means of at least one of the clamp bolts to allow axial movement of the bore welding mechanism.

Also included in a further aspect of the present invention is an in-line support structure for a bore welding mechanism, which includes a mount connector for mounting to a spindle mount of a bore welding mechanism wherein a portion of an outer circumference of the mount connector is tapered to conform to a mating conically tapered surface of the spindle mount, and a casing connector for mounting to a casing bushing extending axially from a casing of a bore welding mechanism coaxially with a spindle of the bore welding mechanism. The casing connector is a hollow, generally cylindrical structure having an internal a diameter greater than a outer diameter of the casing bushing and has three axially extending mounting blocks with each of the mounting blocks extending radially inward from an inner circumferential surface of the casing connector and having an inner surface shaped to conform with a circumferential outer surface of the casing bushing. The circumferential outer surface of the casing bushing is tapered from a lesser diameter at the outer end of the casing bushing away from the casing to an inner end of the casing bushing toward the casing so that the inner surfaces of the mounting blocks will engage with the circumferential outer surface of the casing bushing to mount and align the casing with the in-line support structure.

The in-line support structure may further include an extension spacer extending between the casing connector and the mount connector.

In a still further aspect, the present invention may also include a lateral offset in-line support structure for a bore welding mechanism, which includes an offset body, a centered offset connector at a first end of the offset body, and an adjustable offset connected at a second end of the offset body wherein the centered offset connector and the adjustable offset connector are each connectable to at least one of a bore welding mechanism support structure, a bore tool, and a casing bushing extending axially from a casing of the bore welding mechanism. According to the present invention, the centered offset connector is rotatably mounted into a centered bore in the first end of the offset connector body and the adjustable offset connector is mounted into an eccentric bore in the second end of the offset connector body wherein the eccentric bore is laterally offset with respect to the axis of the adjustable connector and offset connector body, so that rotation between the centered offset connector and the offset connector body and adjustable offset connector will provide an adjustable lateral offset between an axis of the centered offset connector and an axis of the adjustable offset connector while the axis of the centered offset connector remains parallel to the axis of the adjustable offset connector.

The present invention further includes a clamping device for mounting a bore tool to a spindle of a bore welding mechanism wherein the bore tool includes a mounting tube extending axially from the bore tool. The clamping device includes a hollow, cylindrical clamping sleeve formed of a resiliently deformable material and having an internal diameter to closely receive the tool mounting tube, and a ball mounting sleeve having an internal diameter to receive the clamping sleeve and having a plurality of circumferentially located ball retaining holes for retaining a corresponding plurality of clamping balls. An exterior surface of the ball mounting sleeve being tapered in thickness along a slope tapering downwards from a first end of the clamping sleeve toward the spindle and toward a second end of the clamping sleeve toward the bore tool and the clamping device further includes a locking sleeve having an interior surface tapered inversely to the outer surface of ball mounting sleeve so that a first inner diameter of the locking sleeve toward the first end of the ball mounting sleeve is greater than an outer diameter of the ball mounting sleeve and the clamp balls and a second inner diameter of the locking sleeve toward the second end of the ball mounting sleeve is less than the outer diameter of the ball mounting sleeve and the clamp balls. According to the present invention, the tool mounting tube may be slid into the locking sleeve whereupon, displacement of the locking sleeve axially toward the first end of the ball mounting sleeve will result in radially inward pressure on the clamping balls by the inner surface of the locking sleeve, which will exert radially inward pressure on the clamping sleeve and will force regions of the clamping sleeve radially inwards and into engagement with the tool mounting tube.

BRIEF DESCRIPTION OF THE DRAWINGS

The invention will now be described, by way of example, with reference to the accompanying drawings in which:

FIG. 1 is diagrammatic isometric illustration of an exemplary boring welding mechanism according to the prior art;

FIG. 2B is an exploded isometric view of a bore welding mechanism of FIG. 2A;

FIG. 3B is isometric assembled view of the adjustable mount of FIG. 3D;

FIG. 3D is an isometric exploded view of an adjustable mount;

FIGS. 3E, 3F and 3G are isometric and sectional views of an offset support assembly;

FIGS. 3H, 3I, 3J and 3K are assembled and exploded isometric views of a standard and an extended in-line mount;

FIG. 4B is an assembled view showing the ball clamp of FIG. 4A in its installed position on the first end of the spindle; and FIG. 4C is a diagrammatic partial view showing the ball clamp of FIG. 4A.

DETAILED DESCRIPTION OF THE INVENTION

B. Detailed Description of a Bore Welding Mechanism

1. Spindle Drive and Clutch Mechanism

Figure 2A:
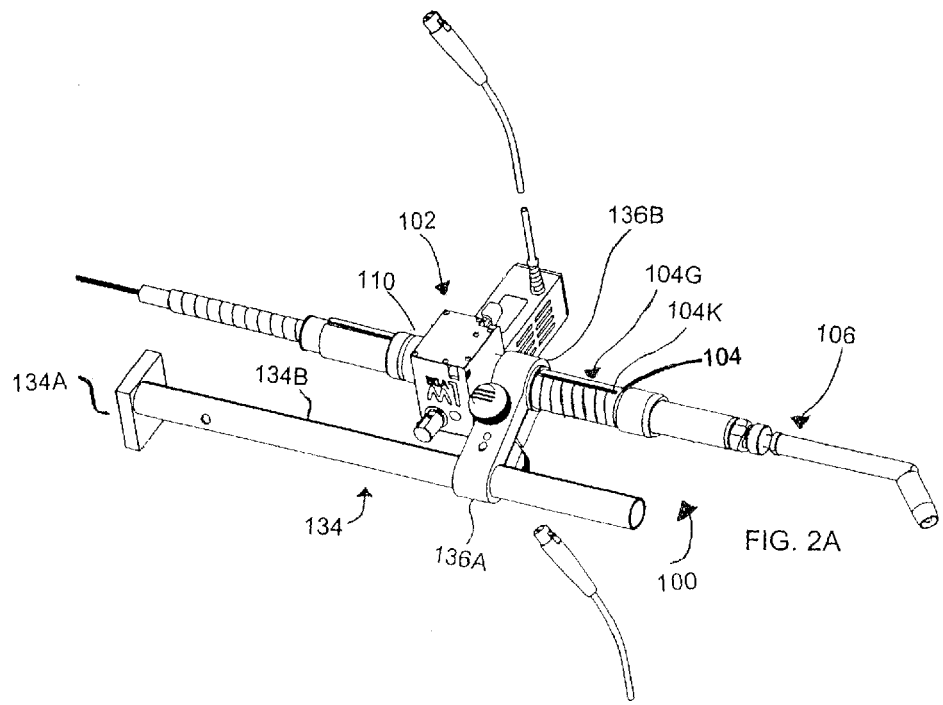
FIG. 2A is an isometric view of an embodiment of the bore welding mechanism according to the present invention.

Turning now to and considering the improved bore welding mechanism 100 of the present invention and specifically an improved spindle drive mechanism, FIG. 2A, is an isometric view of a complete bore welding mechanism 100, which typically includes a bore welding drive mechanism 102 for rotating and axially translating a cylindrical spindle 104 which supports a bore welding device 106, such as a conventional welding torch. The bore welding mechanism 100 is supported in alignment with a desired bore 10 by a spindle support bore welding mechanism 134 that is, in turn, supported by a bore welding mechanism base 134A affixed to a support (not shown) that is firmly affixed to a surface generally somewhat aligned with the bore 10 to be repaired, e.g., the surface is typically either adjacent or opposed from the bore 10 to be repaired.

Referring now to FIGS. 2A and 2B, and FIG. 2B in particular which is the diagrammatic, exploded view of the exemplary bore welding drive mechanism 102. It is to be appreciated that in FIG. 2B, the bore welding drive mechanism 102 is oriented 90°, in the clockwise direction, with respect to the position of the bore welding drive mechanism 102 in FIG. 2A.

As can be seen in FIG. 2B, the housing or casing 112 of the bore welding mechanism 100 has a central cylindrical passageway 113 which extending longitudinally through the housing or casing 112 and this passageway 113, during use, receives and accommodates the spindle 104. A first spindle bushing 114A is received within a first end of the central passageway 113, e.g., this bushing has a slight interference fit with the passageway, while a second spindle bushing 114A is received within the second opposite end of the central passageway 113, e.g., this bushing also has a slight interference fit with the passageway. An inwardly facing surface of each of the first and the second spindle bushings 114A and 114B forms a bearing surface which allow the spindle 104 to rotate within the first and the second spindle bushings 114A and 114B relative to the passageway 113 with minimal friction. The first and the second spindle bushings 114A and 114B thereby both support the spindle 104 along a spindle axis A while permitting relative rotation of the spindle 104 with respect to the passageway 113 and the first and the second spindle bushings 114A and 114B as well as a remainder of the bore welding drive mechanism 102.

The opposed exterior surfaces of the housing or casing 112, which define the central passageway 113, form support structures which, as will be seen below, permit the casing 112, and thus the bore welding mechanism 100, to be supported by various forms of supports and thereby allow the bore welding mechanism 100 to be supported via the end of the casing 112 which is more convenient for the particular application. As can be seen in FIGS. 2B and 2G, the opposed exterior surfaces of the housing or casing 112 are cylindrical in shape, as this facilitates clamping of such surface, but other shapes are also possible.

Figure 4A:
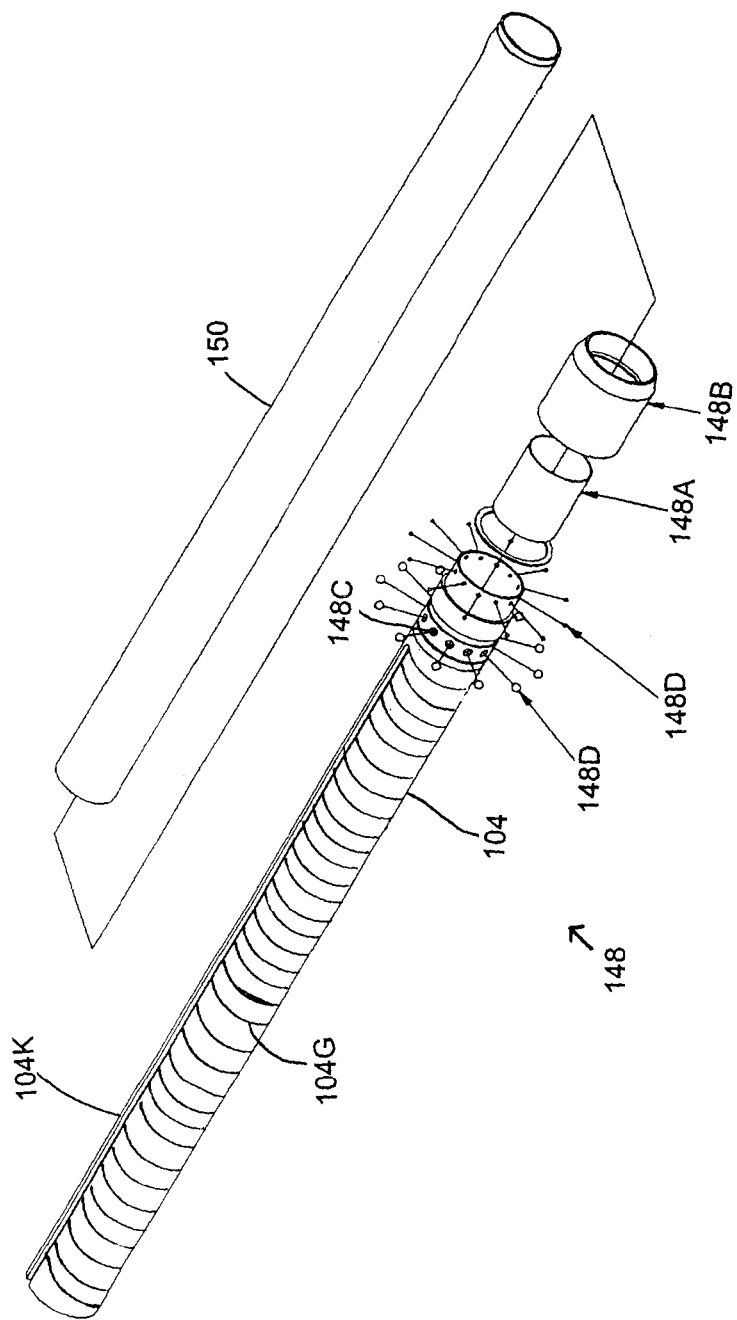
FIG. 4A is an exploded isometric view of a ball clamp according to the present invention.

The spindle 104 is rotationally and axially movable within and relative to the inner surfaces of the spindle bushings 114A and 114B so that the bore welding device 106, in turn, is thus rotationally and axially movable along with the spindle 104. The manner in which the spindle 104 is releasably attached to the bore welding device 106 will be discussed below with reference to FIGS. 4A-4C. As also shown in FIGS. 2A, 4A and 4B, the exterior surface of the spindle 104 includes the axially extending spindle keyway 104K which extends generally longitudinally along the entire axial length of the spindle 104. In addition, the exterior surface of the spindle 104 further includes an external spindle thread 104G also generally extending along the entire axial length of the spindle 104.

As shown in FIG. 2B, a drive shaft 116, of the bore welding drive mechanism 102, extends through another opening through the interior of the casing 112 along an axis B that is arranged generally transverse and offset with respect to axis A of the spindle 104 which is defined by passageway 113. The drive shaft 116 is supported and captively retained within the casing 112 at a fixed orientation along axis A of the spindle 104 by a pair of spaced apart drive shaft bearings 118A and 118B as well as a pair of spaced apart retaining bearings 120A and 120B, located adjacent each opposed end of the drive shaft 116. As also shown, the drive shaft 116 further includes a drive worm 122, located generally between opposed ends thereof. The drive worm 122 is concentrically and coaxially mounted with respect to and integral with the drive shaft 116 so as to rotate along with the drive shaft 116. A pair of opposed washers and retaining clips (not separately numbered), engage with corresponding annular grooves provided adjacent opposed ends of the drive shaft 116 so as to maintain the drive shaft 116 in its installed position while still permitting desired rotation of the drive shaft 116 relative to the casing 112. It is to be appreciated that either end of the drive shaft 116 may be driven to provided drive to the bore repair mechanism 2.

Figure 2C:
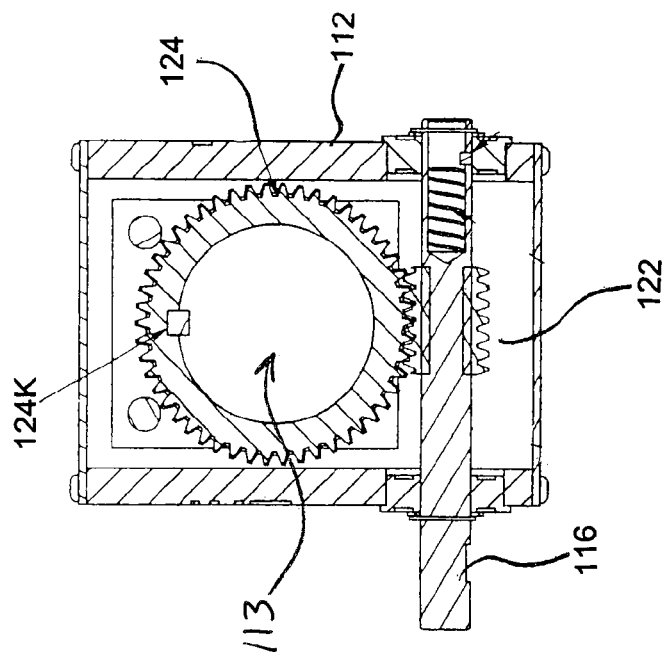
FIG. 2C is a diagrammatic sectional view of the casing and the spindle drive gear of the bore welding mechanism along section line 2C-2C of FIG. 2B.
Figure 2G:
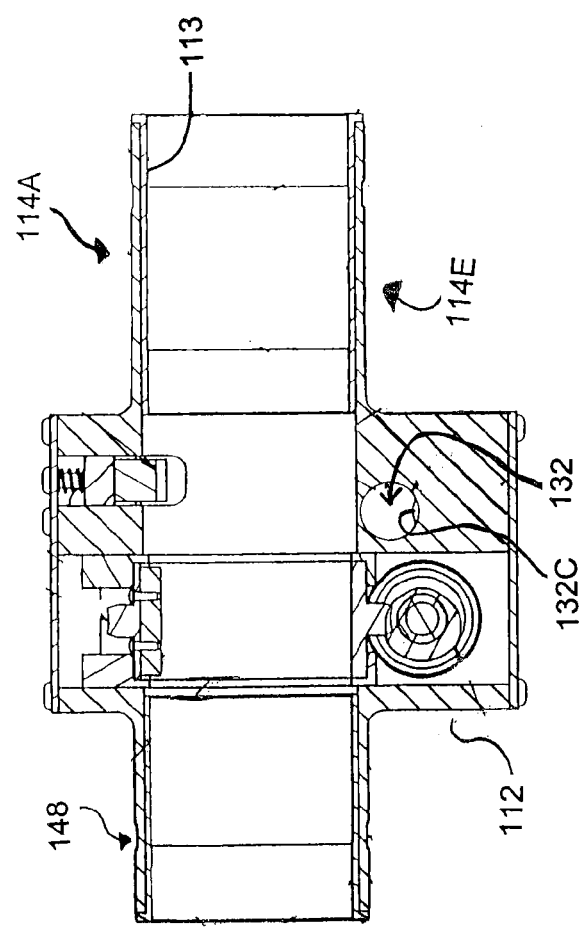
FIG. 2G is a diagrammatic sectional view of the casing and the spindle drive gear of the bore welding mechanism along section line 2G-2G of FIG. 2B.

Now referring to FIGS. 2B, 2C and 2G, the drive worm 122 is arranged so as to engage with a hollow worm gear 124 which is mounted circumferentially about the spindle 104 and slidably engages with the spindle 104 via a drive key 124K which engages with the spindle keyway 104K of the spindle 104. A pair of bearing plates, not separately numbered, support the hollow worm gear 124 within the passageway 113 and minimize frictional resistance of the hollow worm gear 124 as the hollow worm gear 124 is driven and rotates within the passageway 113. Due to this arrangement, rotation of the drive shaft 116 thereby results in a corresponding rotation of the drive worm 122. As the drive worm 122 is engaged with the worm gear 124, such rotation of the drive worm 122 causes a corresponding rotation of the worm gear 124 within the passageway 113. The worm gear 124, in turn, due to its engagement with the spindle 104 via the drive key 124K and the spindle keyway 104K, thereby causes a corresponding rotation of the spindle 104 relative to the first and the second spindle bushings 114A and 114B.

Figure 2E:
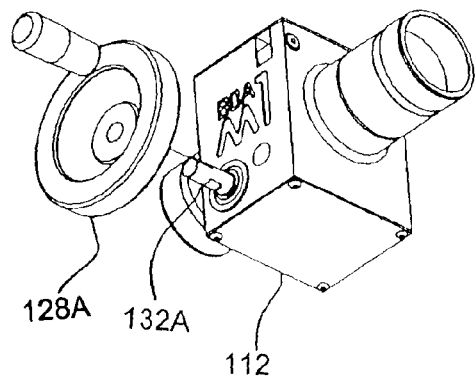
FIG. 2E is an isometric view of an external manual drive for supplying manual drive to the bore welding mechanism.
Figure 2D:
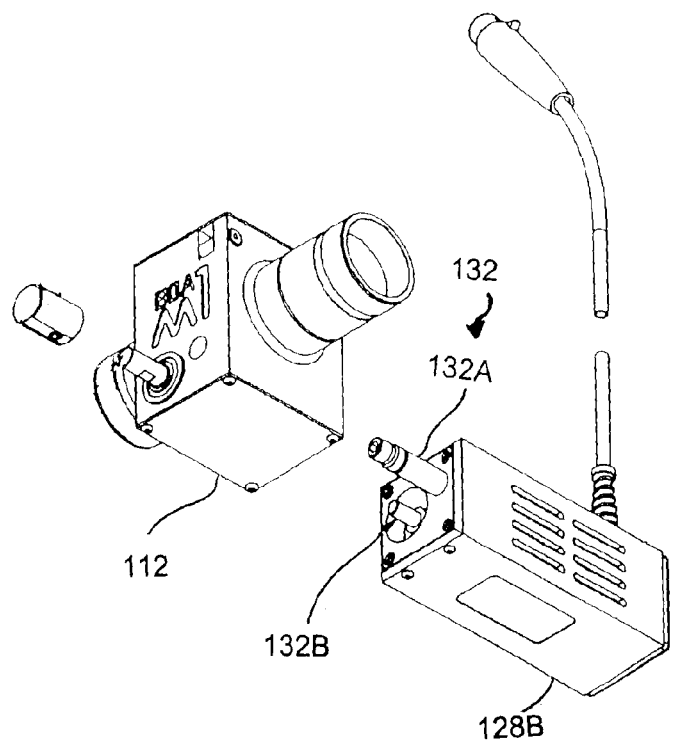
FIG. 2D is an isometric view of showing attachment of an external electric drive to the bore welding mechanism for supplying drive thereto.
Figure 2F:
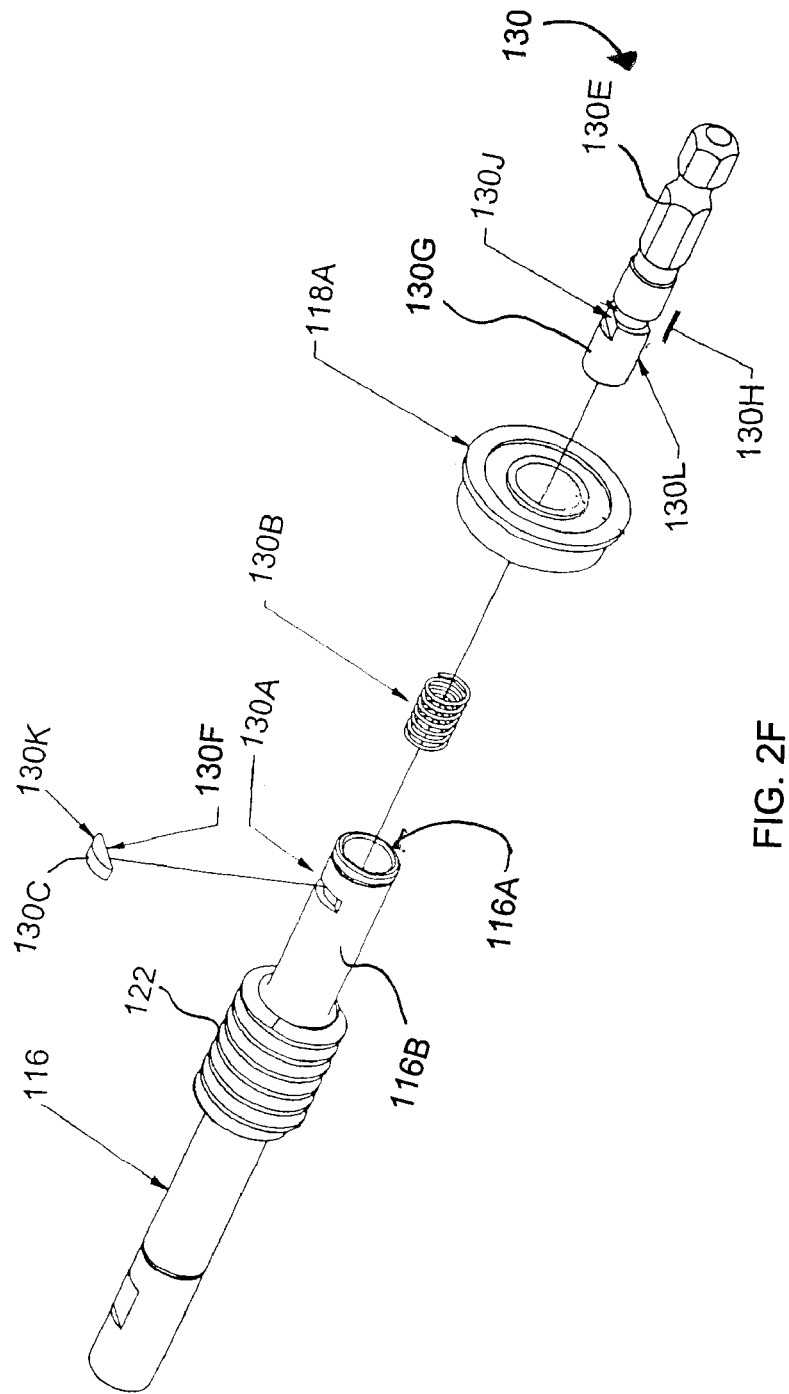
FIG. 2F is isometric exploded view of the components for coupling the drive shaft to the bore welding mechanism.
Figure 2H:
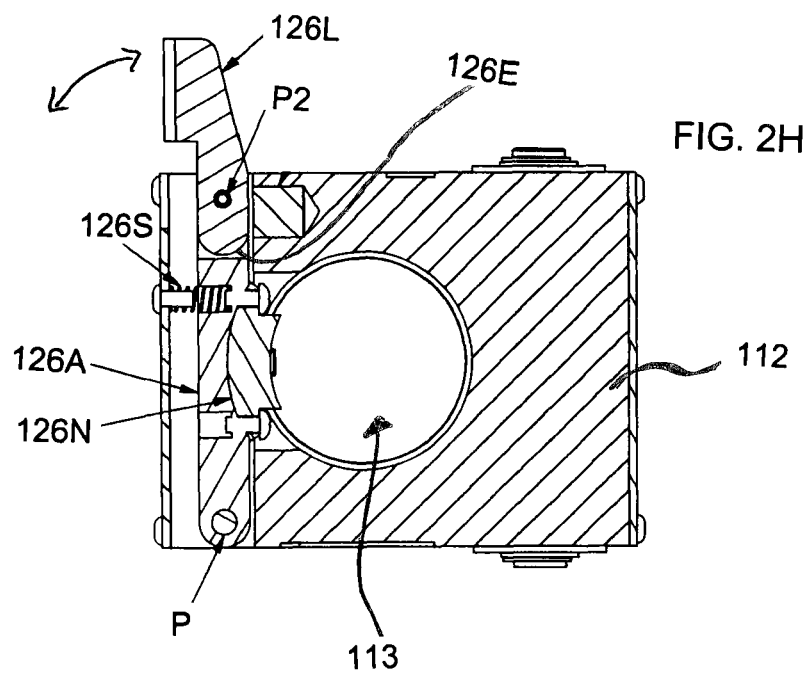
FIG. 2H is a diagrammatic sectional view of the casing showing the drive nut arm in its engaged position so that the drive nut engages with the spindle thread of the spindle.
Figure 2I:
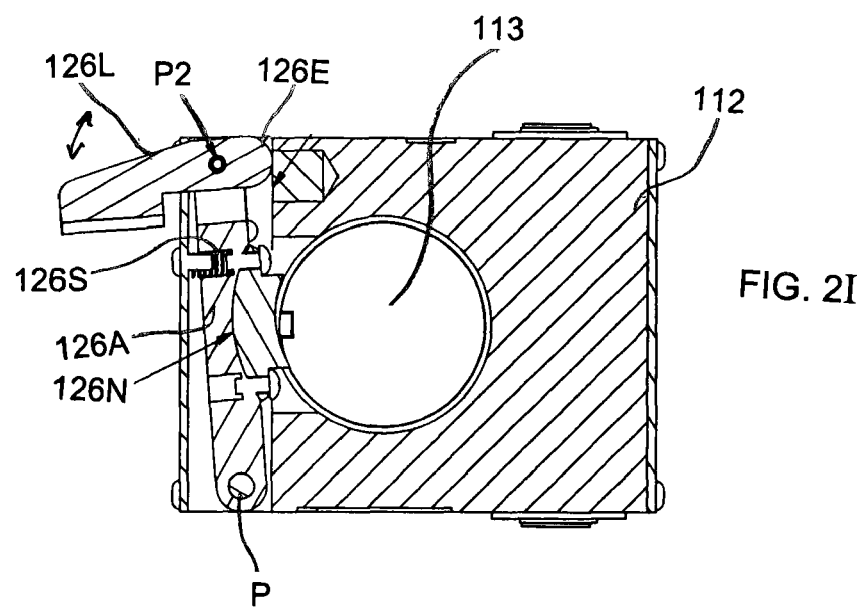
FIG. 2I is a diagrammatic sectional view of the casing showing the drive nut arm in its pivoted disengaged position so that the drive nut is spaced from the spindle thread of the spindle.

As illustrated in FIGS. 2B, 2H and 2I, axial movement of the spindle 104, due to rotation of the drive shaft 116, is accomplished via a drive nut clutch mechanism 126 which, as indicated in these Figures, includes a drive nut arm 126A which may extend parallel to the drive shaft 116 and thus transversely to the orientation of the spindle 104. One end of the drive nut arm 126A is pivotably secured to the casing 112 so as to be pivotable about a transverse pivot P and the drive nut 126N is secured to a surface of the drive nut arm 126A facing the spindle 104 and is thus transverse to and offset from the spindle 104. The opposite end of the drive nut arm 126A is pivotably secured to an intermediate section of a latch 126L via a second pivot P2. The opposite end of the latch 126L extends out of the casing 112 for actuation by an operator. Due to this arrangement, as the latch 126L is moved for the position shown in FIG. 2H to the position shown in FIG. 2I, a remote rounded end 126E of the latch 126L abuts against an adjacent side surface of the casing 112 so as to biases the drive nut 126N away from the external spindle thread 104G of the spindle 104. A spring 126S normally biases the latch 126L into the position shown in FIG. 2H and when the latch 126L is aligned substantially normal to the spring 126S, as shown in FIG. 2I, such configuration of the latch 126L facilitates achieving a substantially stable second the position for the latch 126L.

As shown, drive nut 126N has a circumferentially curved inner surface which corresponds to the curvature of the spindle threaded 104G provided on the outer surface of the spindle 104 and the inner surface of the drive nut 126N carries a corresponding threaded section which is designed to matingly engage with the external spindle thread 104G carried by the spindle 104. An arcuate length of the drive nut 126N, along the circumference of the spindle 104, corresponds to a segment of the outer circumference of the spindle 104. The drive nut arm 126A, depending upon its position, facilitates both engaging the drive nut 126N from the external spindle thread 104G of the spindle 104 (when the drive nut arm 126A is in its first position located adjacent the spindle 104 as shown in FIG. 2H) or disengaging the drive nut 126N from the external spindle thread 104G of the spindle 104 (when the drive nut arm 126A is in its second position spaced from the spindle 104 as shown in FIG. 2I). The drive nut arm 126A and the drive nut 126N thereby function as a fast acting, simple and thereby reliable clutch mechanism for readily coupling/decoupling driving power for the bore welding mechanism 100 and converting such driving power into axial movement of the spindle 104 as well as rotational movement of the spindle 104.

When driving power is supplied to the spindle 104 via the drive shaft 116, the drive worm 122, the worm gear 124, the drive key 124K and the spindle keyway 104K, such power causes the spindle 104 to rotate. If drive nut 126N is engaged with the external spindle thread 104G of the spindle 104, such rotation of the spindle 104 will, due to the engagement between the drive nut 126N and the external spindle thread 104G, result in both rotational as well as axial motion of the spindle 104 and thus the supported bore welding device 106 with respect to the casing 112. The direction of rotational and the axial motion of the spindle 104, and the bore welding device 106, depends upon the direction of rotation of the drive shaft 116, and thus of the spindle 104. The axial distance moved by the spindle 104 and thus the bore welding device 106, due to each rotation of the drive shaft 116, is depend upon the number of threads per inch or pitch of the drive worm gear 112, the worm gear 124, the drive nut 126N and the external spindle thread 104G.

It will thereby be apparent that the bore welding mechanism 100, according to the present invention, is significantly more compact and less complex than the systems of the prior art. The bore welding mechanism 100, according to the present invention, thereby allows improved and easier access to bores, especially bores located in confined areas or spaces while still being reliable.

2. Drive Coupling Mechanism

As described with regard to the prior art bore welding mechanism, the spindles of the prior art are typically axially and rotationally driven by drive mechanisms, such as the motor or other drive mechanism, that are constructed as integral parts of the devices.

The bore welding mechanism 100, according to the present invention, in contrast to devices of the prior art, is capable of being drive or powered by a variety of external drive sources 128, a few of examples of which are illustrated in FIGS. 2D and 2E. It is to be appreciated that a variety of other conventional and well known drive or power sources or devices could also be employed for driving the drive shaft 116 without departing from the spirit and scope of the present invention. FIG. 2D, for example, illustrates a manual power wheel 128A being connected to one end of the drive shaft 116 while FIG. 2E illustrates an electric drive motor 128B being connected to the same end of the drive shaft 116. It is to be appreciated that other forms and/or types of power sources that may be readily attached to either end of the drive shaft 116 include, for example, variable speed portable screw drivers, variable speed drills with adjustable chucks, various forms of local or remote motors driving flexible drive shafts, including electric, hydraulic and pneumatic motors, etc.

To facilitate coupling of one or more of such other forms and/or types of power sources, a quick connect coupling 130 may be mountable to the outer end of the drive shaft 116, and such coupling is shown in an exploded isometric form in FIG. 2F. As shown therein, a hollow leading end 116A of the drive shaft 116 is at least partially hollow and includes a motor key slot 130A formed through an exterior surface 116B of the drive shaft 116 transversely to the axis of the drive shaft 116 and extending along a portion of the circumference of surface 116B of the drive shaft 116 for receiving a motor key 130K. In this embodiment, the motor key 130K is in the form of segment of a disk having an outer diameter approximately that of the outer circumference of the exterior surface 116B with a flat side 130F forming a chord of the disk and a curved outer side 130C forming a portion of the circumference of the disk and is retained within the motor key slot 130A, typically by an inner race of the shaft bearing 118B.

The quick connect coupling 130 comprises a power coupler which can be partially received within and extend axially outward from the hollow leading end 116A of the drive shaft 116 with a conventional external drive connector 130E located on the outer most end of the quick connect coupling 130 for receiving a mating element, for example, a chuck of a drill having variable speed, an electric drive motor, a variable speed portable screw driver, a flexible drive shaft, a socket of a wrench, etc. A bias spring 130B is typically located within the inner most hollow leading end 116A of the drive shaft 116, between a leading end of the power coupler 130 and an inner wall of the hollow leading end 116A of the drive shaft 116 and the spring 30B operates to resiliently urge the power coupler axially out of the leading end 116A of the drive shaft 116.

The power coupler 130 further includes a generally cylindrical locking section 130G located on a leading end of the power coupler 130 wherein locking section 130G is connected to power coupler 130 by a portion 130H of the locking section 130G having a reduced diameter. As indicated, the generally the cylindrical locking section 130G includes a short key cutaway section 130J extending a part of the distance from the narrowed diameter portion 130H toward the leading end of the locking section 130G wherein short key cutaway section 130J is in the form of cutaway segment of the cylindrical shape of the locking section 130G having a flat surface 130J forming a chord of that portion of the locking section 130G. The locking section 130G further includes a long key cutaway section 130L extending from the reduced diameter portion 130H to the leading end of the power coupler 130 wherein the long cutaway section 130L is in the form of cutaway segment of the cylindrical shape of the locking section 130G having a flat surface 130L forming a chord of that portion of the locking section 130G.

Prior to coupling an external drive source 128 to the external drive connector 130E, the locking section 130G of the power coupler 130 is slid into the hollow leading end 116A of the drive shaft 116 such that the long key flat side 130L, of the locking section 130G, is oriented upward toward the flat side 130F of the motor key 130K. The power coupler 130 is forced into the leading end 116A of the drive shaft 116 until the long key flat side 130J of the locking section 130G completely passes by the flat side 130F of the motor key 130K and the narrowed diameter portion 130H is thus generally aligned with motor key 130K. At this stage, the power coupler 130 is then rotated about 180 degrees, within the hollow end of the drive shaft 116, until the short key cutaway section flat side 130J is then aligned with the flat side 130F of the motor key 130K. Once this occurs, the spring 130B is then allowed to axially move the power coupler 130 slightly axially outward, toward the leading end 116A, so that the short key cutaway section flat side 130J passes along the flat side 130F of the motor key 130K and the inner surface of the short key cutaway section flat side 130J abuts against a side surface of the motor key 130K. At this point, the power coupler 130 is generally captively engaged with the drive shaft 116 and a desired external drive source 128 can then be coupled to the drive shaft 116, via the power coupler 130, to facilitate driving the drive bore welding mechanism 100 of the present invention as described herein above. In order to disconnect and remove the power coupler 130 from the drive shaft 116, the above procedure is reversed.

Lastly with regard to coupling the external drive source 128 to the bore welding mechanism 100 of the present invention, the bore welding mechanism 100 further includes a drive source alignment mechanism which both generally aligns and retains the connection between the exterior drive source 128 and the drive shaft 116. As illustrated in FIGS. 2B, 2D and 2G, and for example, a drive source alignment mechanism includes an alignment element 132A essentially comprising a protruding element mounted on or fabricated as part of an external drive source 128 that mates with a corresponding casing opening 132 formed in the casing 112 of the bore welding mechanism 100. The external drive source 128 also includes a drive element 132B which mates with one end of the drive shaft 116. A captively retained ball bearing 132C (see FIG. 2G), or some other protrusion feature, is accommodated within a bore (not numbered) extending normal to the casing opening 132 and this ball bearing 132C is spring biased so as to partially protrude into the casing opening 132 and engage with an opening or some other (annular) groove or feature provided in an exterior surface of the alignment element 132A. Once the ball bearing 132C engages with the opening or other groove provided in an exterior surface of the alignment element 132A, such engagement minimizes the possibility of the exterior drive source 128 becoming inadvertently disconnected from the drive shaft 116 and thereby assists with retaining the exterior drive source 128 in driving engagement with the drive shaft 116. Due to such arrangement, the bore welding mechanism 100 is thereby supported and aligned by two elements, the first being the connection between the exterior drive source 128 and the drive shaft 116 and the second being the interaction between the source alignment element 132A and the casing alignment element 132B.

3. Mounting and Extension Mechanisms

The following will now describe improved mechanisms and structures for mounting and maintaining the bore welding mechanism 100 in alignment with the bore 10, for offset and in-line support of the bore welding device 106 with respect to the bore 10, and elements for mounting the bore welding device 106 in axially extended positions with respect to the bore welding mechanism 100.

a) Adjustable Offset Mount

Figure 3A:
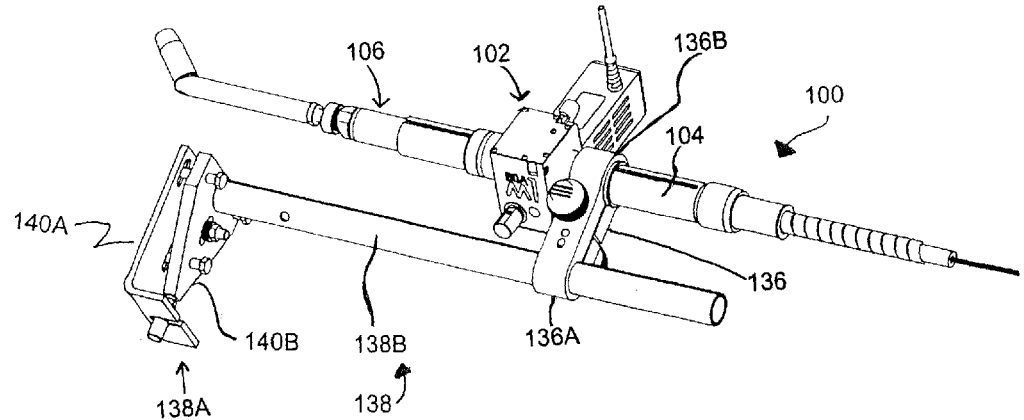
FIG. 3A is an isometric view of a bore welding mechanism with an adjustable mount.

Referring to FIGS. 2A and 3G, the bore welding mechanism 100 is typically mounted to a bore welding mechanism base by a fixed offset mount 134 and the bore welding mechanism base typically comprises a base plate 134A rigidly affixed to a surface (not shown) having a fixed relationship with respect to the bore 10 to be repaired and a mounting shaft 134B that is rigidly affixed to base plate 134A so that the orientation and the position of the mounting shaft 134B with respect to the bore 10 is fixed and known. As illustrated, the fixed offset mount 136 typically includes adjustable clamps 136A and 136B respectively located at the opposite ends of the offset mount 136, with an exterior surface of the casing 112 of the bore welding mechanism 10 being received within and secured to the offset mount 136 by a second adjustable clamp 136B while the opposite end of the offset mount 136 is secured to the mounting shaft 134B of the bore welding mechanism base by the first adjustable clamp 136A. The axial and lateral position and alignment of the bore welding mechanism 100 and thus of the bore welding device 106 with respect to the bore 10 is thereby known and fixed, and can be adjusted by adjustment of the axial and rotational position of the offset mount 136 with respect the to mounting shaft 134B of the bore welding mechanism base, i.e., the offset mount 136, in its loosened position, may be moved or slid axially along the mounting shaft 134B or may be rotated about the mounting shaft 134B, as desired.

As illustrated in FIGS. 3A, 3B, 3C, 3D and 3G, the bore welding mechanism 100 is mounted to and supported by an adjustable mount 138 that includes an adjustable base mechanism 138A and a mounting shaft 138B in which the mounting shaft 138B, and an offset mount 136 by which the bore welding mechanism 100 is mounted to the mounting shaft 138B, are similar to the bore welding mechanism 100 of FIG. 2A discussed above.

Therefore considering adjustable base mechanism 138A in further detail, the adjustable base mechanism 138A includes a fixed base 140A that is secured to a surface (not shown) having a fixed axial and lateral relationship with respect to the bore 10 and an adjustable base 140B to which mounting shaft 138B is affixed. While adjustable base 140B is attached to fixed base 140A, the angular orientation between adjustable base 140B and the fixed base 140A is adjustable with respect to all axis of angular orientation of the adjustable the base 140B and the fixed base 140A. The axial and lateral relationship between mounting shaft 138B and the bore 10, and thus and axial and lateral relationship between the bore welding mechanism 100 and any bore welding device 106 mounted thereto and the bore 10, is likewise adjustable and can be fixed at any desired angular orientation.

Considering the elements by which the angular relationship between adjustable base 140B and the fixed base 140A is adjusted, the adjustable base 140B is generally triangular in shape, but may be of any other desired or appropriate shape, with the mounting shaft 138B mounted thereon offset from a pivot center C of the adjustable plate 140B. The adjustable plate 140B is supported at a known radius from the fixed plate 140A by a post and pivot assembly 140C which extends generally between pivot center C and a corresponding location on the fixed plate 140B so that the adjustable plate 140B can rotate or tilt to any desired angle with respect to the fixed plate 140A within a range of angles determined by the geometry of the fixed and the adjustable plates 140A and 140B.

The angle of the adjustable plate 140B with respect to the fixed plate 140A is adjustable and can be fixed by three angle adjustment screw assemblies 140D, 140E and 140F which are mounted on adjustment plate 140B and are symmetrically located about pivot center C. According to the embodiment illustrated in FIGS. 3B, 3C and 3D, the angle adjustment screw assemblies 140D, 140E and 140F each comprise a threaded shaft supported by the adjustment plate 140B and received within a threaded aperture in the adjustable plate 140B while a leading end of the angle adjustment screw assemblies 140D, 140E and 140F engage with corresponding recess formed in the fixed plate 140A so that the distance between and the fixed plate 140A at each one of angle adjustment screw assemblies 140D, 140E and 140F can be individually adjusted and fixed, thereby allow the angular orientation of the adjustable plate 140B, and thus of mounting shaft 138B with respect to fixed plate 140A, to be selected and fixed.

Lastly, a bore spacing adjustment screw assembly 140G is mounted between the fixed plate 140A and the adjustable plate 140B, along an axis parallel to fixed plate 140A, and generally orthogonal to the axis of the mounting shaft 138B and between an edge of the adjustable plate 140B and the axis of the spindle 104 and the bore 10, thereby allowing the spacing between mounting shaft 138B and the bore 10. As shown, the fixed plate 140A includes lateral adjustment recess 140R to accommodate the lateral movement of the angle adjustment screw assemblies 140D, 140E and 140F during adjustment of the spacing between the mounting shaft 138B and the bore 10.

b) Offset Support Structure

Next considering mechanisms for supporting and extending the spindle 104, and referring first to FIGS. 3E and 3F, which are isometric representations of an offset support assembly 142, it is to be appreciated that it is frequently desirable to support the bore welding mechanism 100 by, for example, an adjustable mount 138 that is parallel to but laterally offset from the axis of the spindle 104. Examples of such offset support for the bore welding mechanism 100 are shown in FIGS. 3E and 3F in which FIG. 3E the casing 112 of the bore welding mechanism 100 is supported by a mounting shaft 138B that is offset from but parallel to the axis of the spindle 104. In the embodiment shown in FIG. 3E, the casing 112 of the bore welding mechanism 100 is supported by a spindle offset mount 136 as described herein above with one clamp 136A or 136B being affixed to one of end of the casing 112, and the other clamp 136A or 136B being affixed to the mounting shaft 138B. In the embodiment shown in FIG. 3F, the spindle 104 is supported by the spindle offset mount 136 with one clamp 136A or 136B being affixed to one of the first and the second spindle bushings 114A and 114B, which extend axially from the casing 112, and the other clamps 136A or 136B being affixed to the mounting shaft 138B.

As illustrated in FIG. 3G, the spindle offset mount 136 generally comprises a single body of a resiliently deformable material, such as possibly a plastic or certain resilient metals, such as aluminum or spring steel, the ends of which are shaped so as to form two clamps 136A and 136B, each of which can be tightened or loosened by a corresponding hand operated threaded tightening knobs 136C or 136D. By suitable tighten or loosening of the tightening knobs 136C or 136D for the first and the second clamps 136A and 136B, internal diameter of the first and the second clamps 136A and 136B can be increased or deceased so as to tighten or loosen and thereby secure or release either one end of the casing 112 or the mounting shaft 138B.

As shown in FIG. 3G, a threaded through bore is provided in a side wall of the first clamp 136A of the spindle offset mount 136 and a ball spring, captively retained and spring biased radially outwardly, or a threaded set screw 136S, with a generally rounded leading end or head, is threadedly engaged within this threaded through bore. As the ball spring or set screw 136S is screwed radially inward, the rounded leading end or head of the ball spring or set screw 136S eventually partially extends out of the threaded through bore and projects into the interior space of the clamp. The mounting shaft 1388 has a corresponding set screw groove 138G which extends generally longitudinally along an exterior surface of the mounting shaft and this set screw groove 138G has a transverse contour or cross section for matingly engaging with the generally rounded leading end or head of the ball spring or set screw 136S. Such engagement between the generally rounded leading end or head of the ball spring or set screw 136S and the set screw groove 138G further assists with retained the aligned orientation, as well as assists with realignment, of those two components with one another.

If the ball spring or set screw 136S is retracted from engagement with the set screw groove 138G and then the spindle offset mount 136 is suitably loosened and rotated about the mounting shaft 138B, to assist with preforming a desired task, the spindle offset mount 136 can again be easily realigned back to this initial position. The operator merely returns the spindle offset mount 136 generally back to its previous position so that the ball spring or set screw 136S is generally aligned with the longitudinally extending set screw groove 138G of the mounting shaft 138B. As this ball spring or set screw 136S is gradually retightened or urged outwardly into the set screw groove 138G, such action generally centers the ball spring or set screw 136S, and thus the spindle offset mount 136, with the set screw groove 138G and this precisely repositions the spindle offset mount 136, relative to the mounting shaft 138B, back to its previous position.

c) Standard and Extended In Line Support Structures

Referring to FIGS. 3H and 3I and 3J and 3J, assembled and exploded isometric views of a standard in-line mount 142A and an extended in-line mount 142B are respectively shown which allow the axial position of the bore welding mechanism 100 with respect to a spindle mount 142C and the bore 10 to be adjusted by mounting the bore welding mechanism 100 to the spindle mount 142C by either a standard in-line mount 142A or an extended in-line mount 142B.

As shown in FIGS. 3H, 3I, 3J and 3K, the standard and the extended in-line mounts 142A and 142B each include a casing connector 144A that mates with, for example, an exterior surface adjacent one end of the casing 112, typically located remote from the welding tip of the boring welding device 106, and a mount connector 144B that mates to, for example, a spindle mount 142C, such as an adjustable mount 138 or an offset spindle mount 136 or some other mount having a structure conforming with a mount connector 142C. An extended in-line mount 142B further includes a hollow, generally cylindrical extension spacer 142D located between casing connector 144A and mount connector 144B, with casing connector 144A and mount connector 144B being connected or mounted to the extension spacer 142D, so that the axial spacing between the bore welding mechanism 100 and the spindle mount 142C may be selected according to whether the bore welding mechanism 100 is mounted thereto by a standard in-line mount 142A or an extended in-line mount 142B.

As shown in FIGS. 3H, 3I, 3J and 3K, the mount connector 144B of a standard in-line mount 142A and of an extended in-line mount 142B comprises a tapered portion of the outer circumferential surface of the mount connector 144B and is dimensioned to fit and conform to the corresponding conically tapered surfaces of many spindle mounts 142C, such as an adjustable mount 138 or an offset spindle mount 136 or any other spindle mount 142C having a structure conforming with a mount connector 144B.

Figure 3C:
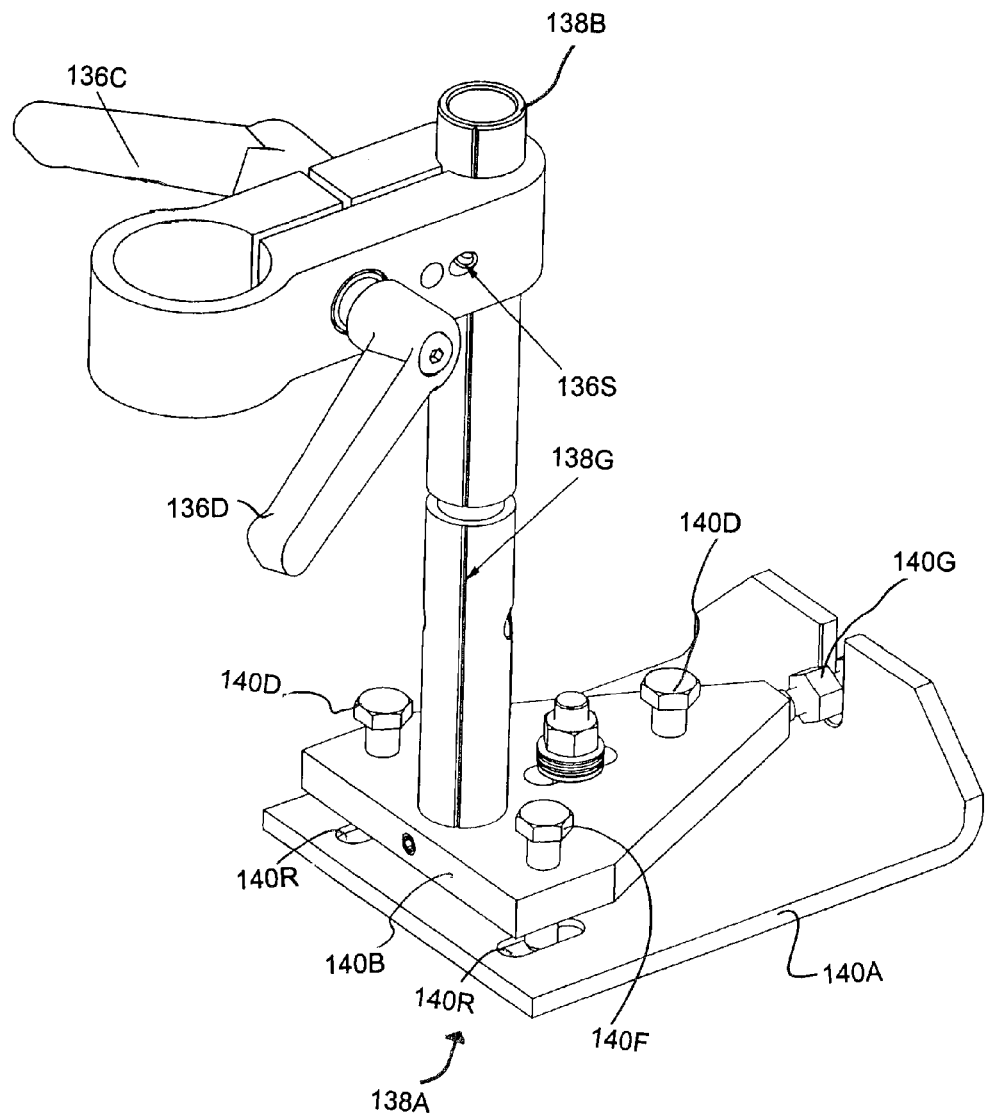
FIG. 3C is isometric assembled view of the adjustable mount of FIG. 3D with a clamp affixed thereto.
Figure 3L:
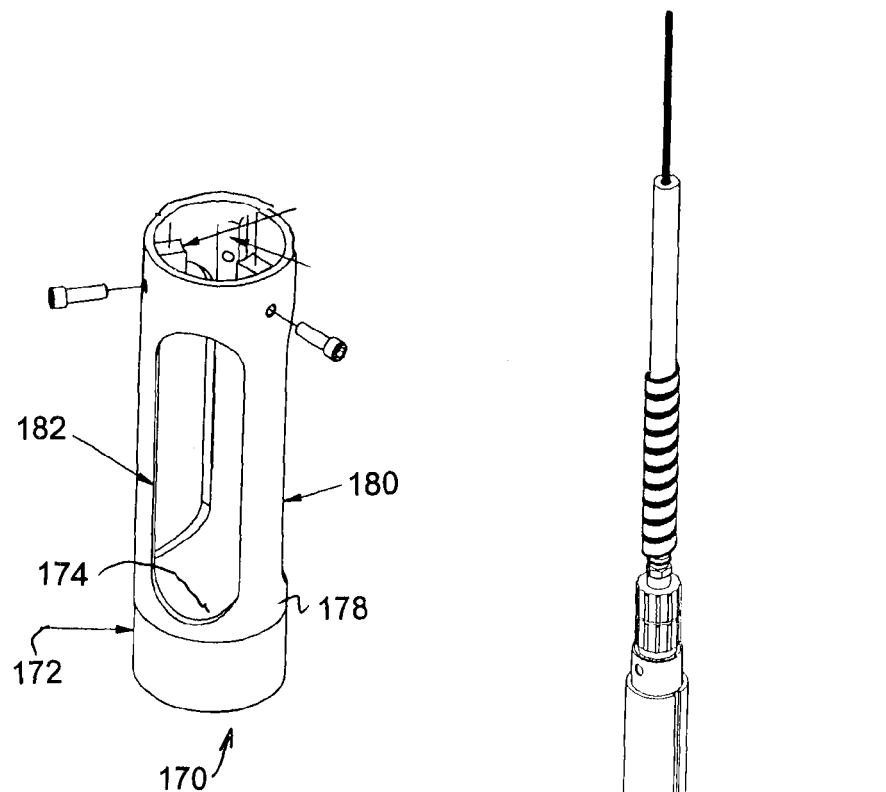
FIG. 3L is an isometric view showing features of a longer offset extension.
Figure 3M:
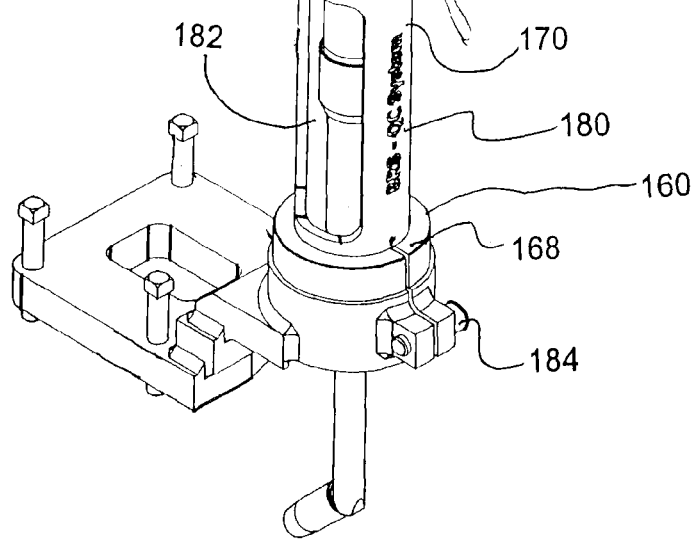
FIG. 3M is diagrammatic illustration showing the bore welding device being supported by a lateral offset in-line mount.
Figure 3N:
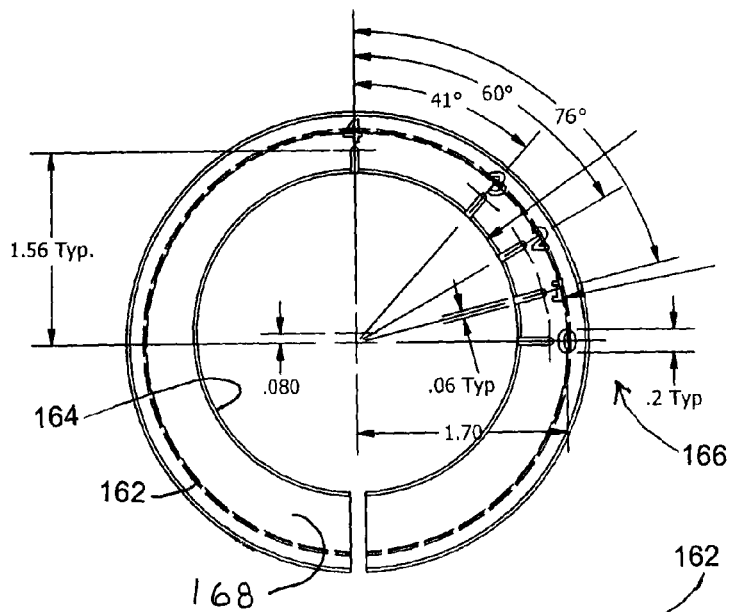
FIGS. 3N and 3O are respectively a diagrammatic top plan and an isometric view showing features of the offset support.
Figure 3O:
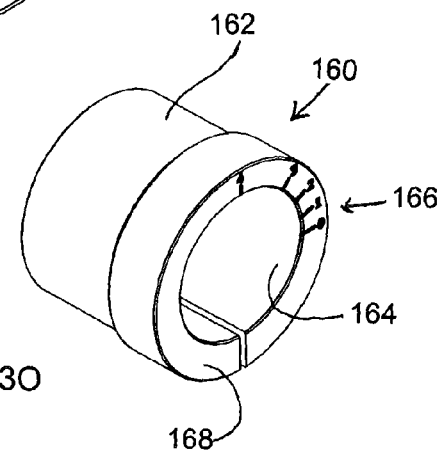
Figure 3P:
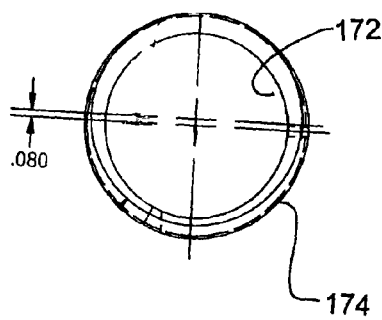
FIGS. 3P and 3Q are respectively a diagrammatic top plan and an isometric view showing features of a short offset extension.
Figure 3Q:
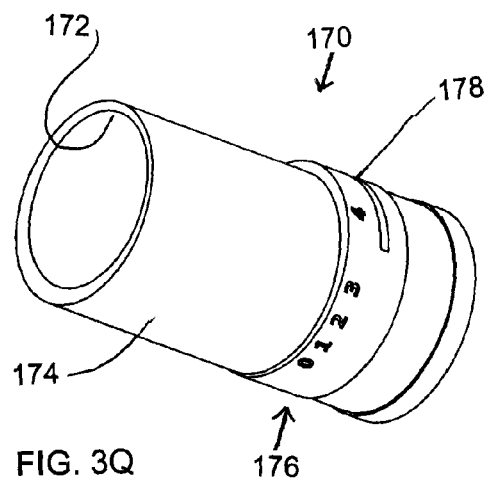

In this embodiment of the standard in-line mount 142A and of the extended in-line mount 142B, the casing connector 144A comprises a hollow, cylindrical structure of a diameter greater than the outer diameter of the cylindrical surface of the casing 112 and having three axially extending mounting blocks 144C. Each of mounting blocks 144C extends radially inward from the inner circumferential surface of the casing connector 144A and has an inner surface 144D shaped to conform with the circumferential outer surface 144E of the cylindrical surface of the casing 112, which is shown in FIG. 3L with inner surfaces 144D of the mounting blocks 144C being located along a circumferential radius approximating that of the circumferential outer surface 144E of casing bushing 114A. Circumferential outer surface 144E of the casing 112 tapers from a smaller diameter at the outer end thereof, that is, the end away from the casing 112, to the inner end of the circumferential outer surface 144E of the casing 112, that is, the end adjacent the casing 112. The inner surfaces 144D of the mounting blocks 144C will therefore engage in firm contact with the circumferential outer surface 144E of the casing 112 when the casing connector 144A of a standard in-line mount 142A or the extended in-line mount 142B is engaged with the casing 112, thereby mounting and aligning the casing 112 and, in turn, the bore welding mechanism 100 with the standard in-line mount 142A or the extended in-line mount 142B and thus with the bore 10 and the spindle mount 142C.

d) Lateral Offset In-Line Support Structure

Now referring to FIGS. 3M, 3N, 3O, 3P and 3Q, a detailed description concerning an offset support will now be provided. As can be generally seen in those Figs. an outer surface 162 of the offset support 160 is cylindrical and has a central axis. An inner cylindrical surface 164 of the offset support 160, however, is offset or eccentric with respect to the outer cylindrical surface 162 by a distance of from about 0.020 to about 0.200 of an inch (e.g., typically about 2 mm, for example) so that the central axis of the inner cylindrical surface 164 of the offset support 160 is offset, eccentric or spaced from, the central axis of the outer cylindrical surface 162 of the offset support 160 by a distance of 2 mm. A set of marking indicia 166, e.g., 0, 1, 2, 3 and 4, is located on an exterior surface of the offset support 160. Indica 1 is located at an angle of about 14° with respect to the 0 position, indica 2 is located at an angle of about 30° with respect to the 0 position, indica 3 is located at an angle of about 49° with respect to the 0 position, and indica 4 is located at an angle of about 90° with respect to the 0 position. It is to be appreciated that other relative angles and indicia could readily be employed without departing form the spirit and scope of the present invention.

A leading end of the offset extension 170, which is to be received and supported by the inner cylindrical surface 164 of the offset support 160, is complimentarily configured. That is, an inner cylindrical surface 172 of the offset extension 170 has a centrally located axis while an outer cylindrical surface 174 of the offset extension 170, however, is offset or eccentric with respect to the inner cylindrical surface 172 by a distance of from about 0.020 to about 0.200 of an inch (e.g., typically about 2 mm, for example) so that the central axis of the outer cylindrical surface 174 of the offset extension 170 is offset, eccentric, or spaced from, the central axis of the inner cylindrical surface 172 of the offset extension 170 by a distance of about 2 mm. As with the offset support 160, an exterior surface of the offset extension 170 has corresponding marking indicia 176, e.g., 0, 1, 2, 3 and 4, with indicia 1 being located at an angle of about 14° relative to position 0, position 2 being located at an angle of about 30° relative to position 0, position 3 being located at an angle of about 49° relative to position 0, and position 4 being located at angle of about 90° relative to position 0. A collar 178 prevents the offset extension 170 from passing completely through the offset support 160 and forms a bearing surface with a top surface 168 of the offset support 160.

Due to this arrangement, when the eccentric end of the offset extension 170 is received within the eccentricity of the offset support 160 so that eccentricity, e.g., the 2 mm offset, of the offset extension 170 is located 180° with respect to the eccentricity, e.g., the 2 mm offset, of the offset support 160, the two eccentricities essential combined and cancel one another out so that the central axis of the offset extension 170 is coincident with the central axis of the offset support 160. However, when either one of the offset extension 170 and/or the offset support 160 is rotated relative to one another by an angle of 90°, then the central axis of the offset extension 170 is located about 2 mm from the central axis of the offset support 160. If either one of the offset extension 170 and/or the offset support 160 is further rotated relative to one another by an additional angle of 90°, then the two eccentricities combined with one another so that the central axis of the offset extension 170 is spaced or offset from the central axis of the offset support 160 by a distance of 4 mm. As a result of this, the supported bore welding mechanism 100 is, in turn, correspondingly offset from the central axis of the offset support 160. According, as either one of the offset extension 170 and/or the offset support 160 is rotated relative to one another, then an offset of between 0 and 4 mm can be easily achieved so as to provide a fine tuning adjustment. Moreover, it is to be appreciated that a clamp 184, for the offset support 160 carrying the offset extension 170, can be loosened so that the offset support 160 together with the offset extension 170, can be rotated 360° with respect to the supporting structure so that the desired offset adjustment can be precisely orientated in any desire angular position. The overlapped indicia will normal indicate the location of the eccentricity.

Now referring to FIG. 3L, a brief description concerning a longer offset extension 170 will now be provided. As this embodiment is quite similar to the offset support just discussed, only the differences between this embodiment and the previous embodiment will be discussed.

The major difference between this embodiment and the previously discussed embodiment is that the length of the offset extension 170 is increased so as to space the bore welding mechanism 100 either closer to or further away from the bore 10 to be repaired, depending upon the support arrangement for the bore welding mechanism 100. In addition, a sidewall 180 of the offset extension 170 has one or more cutouts or opens 182 formed therein so as to provide access to the interior of the offset extension 170 and facilitate rotation or other adjustment of the bore welding mechanism 100. If desired or necessary, a sleeve or collar may be received within the opposite end to facilitate attachment of an end of the casing 112 of the bore welding mechanism 100. In all other respects, this embodiment is identical to the previously discussed embodiment.

4. Tool Clamping Device

Referring to FIGS. 4A and 4B, therein are respectively shown an exploded isometric view and a partial sectional view of a ball clamp 148 for mounting, for example, the bore welding device 106 within an interior of the spindle 104 of the bore welding mechanism 100. As shown therein, the bore welding device 106 to be mounted within the spindle 104 of the bore welding mechanism 100 includes a cylindrical mounting tube 150 that is received by and releasably secured to a ball clamp 148 supported adjacent a first end of the spindle 104.

The first end of the spindle 104, as can be seen in FIG. 4C for example, generally tapers in thickness toward the first end thereof. A plurality of circumferentially located ball retaining through holes 148C are formed within this tapered section of the spindle 104, each of the plurality of circumferentially located ball retaining through holes 148C is located along a single circumferential path around the spindle 104. Each ball retaining through hole 148C receives and retains a corresponding clamp ball 148D therein. As generally shown in FIG. 4C, an inner facing surface of the tapered section of the spindle 104 has a recessed section 104R, the purpose of which will be discussed below.

At least one circumferentially row of ball retaining holes 148C is formed circumferential around the spindle 104 although it is possible to have two or more spaced circumferentially rows of ball retaining through holes 148C formed circumferential around the spindle 104. FIGS. 4A and 4C show two spaced apart circumferentially rows of ball retaining through holes 148C. An external thread 104T is formed in the exterior surface of the tapered section of the spindle 104, typically between the two spaced apart circumferentially rows of the ball retaining holes 148C, for engaging with a ball mounting sleeve 148B, the purpose of which is discussed below.

The ball clamp 148 further includes a thin hollow, cylindrical clamping sleeve 148A comprising a hard but resiliently deformable material, such as a plastic for example, which has an internal diameter which closely surrounds and receives the exterior surface of the mounting tube 150. The clamping sleeve 148A is, in turn, captively received within the recessed section 104R of the spindle 104 and the clamping sleeve 148A facilitates retention of the clamp balls 148D within the respective circumferentially retaining through holes 148C. To positively retain the clamp balls 148D within the respective circumferentially retaining holes 148C, a outer ball mounting sleeve 148B fits closely around and surrounds the tapered section of the spindle 104. As indicated in the FIG. 4C, the inwardly facing surface of the ball mounting sleeve 148B tapers in thickness from a first, thicker end 148E (i.e., a smaller diameter section) located adjacent the leading end of the tapered section of the spindle 104 toward a second, thinner end 148F (i.e., a larger diameter section) located adjacent a remainder of the spindle 104, so that the inner surface of the ball mounting sleeve 148B slopes or tapers downwards, that is, from a larger diameter second, thinner end 148F toward a smaller diameter first, thicker end 148E of the ball mounting sleeve 148B.

An inner surface of the mounting sleeve 148B has a thread 148T which matingly engages with the thread on the exterior surface 104T of the tapered section of the spindle 104 to releasably threadedly secure the mounting sleeve 148B to the tapered section of the spindle 104. Due to this arrangement, as the mounting sleeve 148B is threaded further onto the tapered section of the spindle 104. the inwardly facing tapered surface of the ball mounting sleeve 148B gradually force the clamp balls 148D radially inward within the respective circumferentially retaining through holes 148C into engagement with the exterior surface of the cylindrical clamping sleeve 148A. As the cylindrical clamping sleeve 148A is impacted by the clamp balls 148D, the cylindrical clamping sleeve 148A readily deforms into the exterior surface of the mounting tube 150 and thus facilitates a secure frictional attachment and retention of the mounting tube 150 to the spindle 104. Due to such attachment, all motion of the spindle 104 is directly transferred to the mounting tube 150 and thus onto the supported the bore welding device 106.

Since certain changes may be made in the above described improved feed mechanism for feeding a spindle, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A bore welding mechanism comprising:
a casing having spindle bushings rotationally and axially supporting a rotatable and axially translatable spindle for supporting a bore repair mechanism in alignment with a bore,
the spindle having an axially extending keyway and a worm gear thread extending for at least a part of a length of the spindle and including a spindle drive gear coupled to the spindle by a drive key engaging with the keyway of the spindle so that the spindle is rotationally fixed to the spindle drive gear and axially translatable with respect to the spindle drive gear, and a drive shaft extending through the casing transversely to and offset from an axis of the spindle and including a drive shaft worm gear rotationally fixed to the drive shaft and engaged with the spindle drive gear to rotate the spindle drive gear and the spindle by rotation of the drive shaft.

2. The bore welding mechanism of claim 1, further comprising:

a spindle drive clutch mechanism, including
a drive nut arm mounted to the casing by a pivot and extending transversely to and offset from the axis of the spindle, and
a drive nut mounted to the drive nut arm and having a circumferentially curved inner surface conforming to an outer spindle thread of the spindle, the inner surface of the drive nut being threaded to engage the spindle thread, whereby
the drive nut is axially fixed with respect to the axis of the spindle with the threaded inner surface of the drive nut being brought into engagement or out of engagement with the spindle thread by rotation of the drive nut arm about the casing pivot, so that when the drive nut arm is rotated to engage the drive nut thread with the spindle thread, the spindle is axially traversed along the spindle axle by rotation of the drive shaft.

3. The bore welding mechanism of claim 1, wherein:

the casing further includes first and second spindle bushings radially supporting the spindle and the first and second spindle bushings extend axially from an internal passageway of the casing from first and second axial ends of the passageway and along the axis of the spindle.

4. The bore welding mechanism of claim 1, further comprising:

an external drive coupler mountable in and extending outward from a hollow outer end section of the drive shaft for connecting an external drive mechanism to the drive shaft of the bore welding mechanism, including
a external drive connector mounted on an outer end of the external drive coupler for connection to an external drive mechanism, and
a generally cylindrical locking section connected with the external drive connector and located on an end of the external drive coupler toward the drive shaft and having a first diameter closely fitting into the hollow outer end section of the drive shaft, the locking section including
a first section located at a first end of the locking section adjacent the external drive connector and having a second diameter smaller than the first diameter of the locking section,
a short key cut away section extending from the first narrowed diameter section of the locking section toward a second end of the locking section adjacent the drive shaft wherein short key cutaway section is a cut away segment of the cylindrical locking section with a flat side forming a chord of that portion of the locking section,
a long key cut away section extending between the first narrowed diameter section of the locking section and to the second end of the locking section wherein the long key cut away section is a cutaway segment of the cylindrical locking section with a flat side forming a chord of that portion of the locking section, and a bias spring located in the hollow drive shaft between the external drive coupler and an inner end of the hollow end of the drive shaft to resiliently bias the external drive coupler toward the outer end of the drive shaft, and in the hollow outer end section of the drive shaft,
a motor key slot extending through the wall of the drive shaft transversely to the drive shaft to receive a motor key forming segment of a disk having a flat side forming a chord of the disk.

5. The bore welding mechanism of claim 1, whereby:

an external drive mechanism may be connected to the external drive connector and the external drive coupler connected to the drive shaft by
sliding the locking section into the hollow end of the drive shaft with the flat side of the long key cut away section oriented toward the flat side of the motor key with flat side of the long key cut away section passing along the flat side of the motor key until the narrower diameter first section of the locking section is aligned with the motor key,
rotating the locking section in the hollow end of the drive shaft until the flat side of the short key cut away section is aligned with the flat side of the motor key, and
allowing the bias spring to move the locking section outwards with respect to the drive shaft with the flat side of the short key cut away section passing along the flat side of the motor key until an inner end of the flat side of the short key cut away section abuts the motor key.

6. The bore welding mechanism of claim 5, whereby:

the external drive mechanism may be disconnected from the external drive connector and the external drive coupler by reversal of the connecting steps.

7. The bore welding mechanism of claim 1, further comprising an adjustable mount for the bore welding mechanism, and the adjustable mount comprising:

a fixed base secured to a surface having a fixed axial and lateral relationship with a bore,
an adjustable base moveably mounted to the fixed base and
a mounting shaft mounted to the adjustable base to be secured to one of a spindle and a spindle bushing extending from a casing of the bore welding mechanism, wherein
the adjustable base includes
a pivot support extending between a center of angular rotation of the adjustable base about a pivot center of the fixed base and supporting the center of angular rotation of the adjustable base at a fixed radius with respect to the pivot center of the fixed base,
a plurality of angle adjustment screw assemblies symmetrically located about the center of angular rotation of the adjustable base and contacting the fixed base at locations symmetrically located about the pivot center of the fixed base for adjusting an angle of rotation of the adjustable base with respect to the fixed base, and
a mounting shaft spacing adjustment screw assembly mounted between the fixed base and the adjustable base along an axis generally parallel to the fixed base and generally orthogonal to an axis of the mounting shaft for adjusting a lateral position of the axis of the mounting shaft with respect to a bore, and wherein the fixed base includes a plurality of lateral adjustment grooves for receiving the mating ends of the angle adjustment screw assemblies to support movement of the mating ends of the angle adjustment screw assemblies with lateral movement of the adjustable base with respect to the fixed base.

8. The bore welding mechanism of claim 1, further comprising an offset support structure for the bore welding mechanism, and the offset support comprising:

an offset mount body comprising a resiliently deformable material, the ends of the offset mount body being shaped to form two clamps, and a clamp knob for and corresponding to each clamp for adjusting the corresponding clamp, whereby one of the clamps is secured to one of a spindle and a spindle bushing extending from a casing of the bore welding mechanism and another of the clamps is secured to a supporting shaft, and wherein the clamps are adjustable by at least one of the clamp knobs to allow axial movement of the bore welding mechanism.

9. The bore welding mechanism of claim 1, further comprising an in-line support structure for the bore welding mechanism, and the in-line support structure comprising:

a mount connector for mounting to a spindle mount of a bore welding mechanism, a portion of an outer circumference of the mount connector being tapered to conform to a mating conically tapered surface of the spindle mount, and a casing connector for mounting to a casing bushing extending axially from a casing of a bore welding mechanism coaxially with a spindle of the bore welding mechanism, the casing connector being a hollow, generally cylindrical structure having an internal a diameter greater than a outer diameter of the casing bushing and having three axially extending mounting blocks, each of the mounting blocks extending radially inward from an inner circumferential surface of the casing connector and having an inner surface shaped to conform with a circumferential outer surface of the casing bushing, wherein the circumferential outer surface of the casing bushing is tapered from a lesser diameter at the outer end of the casing bushing away from the casing to an inner end of the casing bushing toward the casing so that the inner surfaces of the mounting blocks will engage with the circumferential outer surface of the casing bushing to mount and align the casing with the in-line support structure.

10. The in-line support structure of claim 9, further comprising:

an extension spacer extending between the casing connector and the mount connector.

11. A lateral offset in-line support structure for a bore welding mechanism, comprising:

an offset body, a centered offset connector at a first end of the offset body, and an adjustable offset connected at a second end of the offset body, the centered offset connector and the adjustable offset connector each being connectable to at least one of a bore welding mechanism support structure, a bore tool, and a casing bushing extending axially from a casing of the bore welding mechanism, wherein centered offset connector rotatably mounted into a centered bore in the first end of the offset connector body, and the adjustable offset connector is mounted into an eccentric bore in the second end of the offset connector body wherein the eccentric bore is laterally offset with respect to the axis of the adjustable connector and offset connector body, whereby rotation between the centered offset connector and the offset connector body and adjustable offset connector will provide an adjustable lateral offset between an axis of the centered offset connector and an axis of the adjustable offset connector while the axis of the centered offset connector remains parallel to the axis of the adjustable offset connector.

12. A clamping device for mounting a bore tool to a spindle of a bore welding mechanism, the bore tool including a mounting tube extending axially from the bore tool and the clamping device comprising:

a hollow, cylindrical clamping sleeve formed of a resiliently deformable material and having an internal diameter to closely receive the tool mounting tube, and a ball mounting sleeve having an internal diameter to receive the clamping sleeve and having a plurality of circumferentially located ball retaining holes for retaining a corresponding plurality of clamping balls, an exterior surface of the ball mounting sleeve being tapered in thickness along a slope tapering downwards from a first end of the clamping sleeve toward the spindle and toward a second end of the clamping sleeve toward the bore tool, and a locking sleeve having an interior surface tapered inversely to the outer surface of ball mounting sleeve so that a first inner diameter of the locking sleeve toward the first end of the ball mounting sleeve is greater than an outer diameter of the ball mounting sleeve and the clamp balls and a second inner diameter of the locking sleeve toward the second end of the ball mounting sleeve is less than the outer diameter of the ball mounting sleeve and the clamp balls, whereby the tool mounting tube may be slid into the locking sleeve, and when the locking sleeve is displaced axially toward the first end of the ball mounting sleeve will result in radially inward pressure on the clamping balls by the inner surface of the locking sleeve, which will exert radially inward pressure on the clamping sleeve and will force regions of the clamping sleeve radially inwards and into engagement with the tool mounting tube.

* * * * *